United States Patent [19]

Kanda et al.

[11] Patent Number: 5,672,422
[45] Date of Patent: Sep. 30, 1997

[54] PACKING MATERIAL FOR COLUMN AND PROCESS FOR PRODUCTION THEREOF

[75] Inventors: Taketoshi Kanda; Atsuo Sakamoto; Michio Yokouchi; Yutaka Ohtsu, all of Yokohama, Japan

[73] Assignee: Shiseido Company Ltd., Tokyo, Japan

[21] Appl. No.: 841,157

[22] Filed: Feb. 25, 1992

[30] Foreign Application Priority Data

Feb. 28, 1991 [JP] Japan ................................. 3-057785

[51] Int. Cl.$^6$ ............................. B32B 3/26; B29C 67/00; D04H 1/64; B05D 3/04
[52] U.S. Cl. .................... 428/304.4; 264/46.4; 264/83; 264/128; 427/333; 427/340; 427/386; 427/387
[58] Field of Search ............... 428/304.4; 264/46.4, 264/83, 129; 427/333, 340, 386, 387

[56] References Cited

U.S. PATENT DOCUMENTS

| | | | |
|---|---|---|---|
| 4,909,935 | 3/1990 | Bradshaw et al. | 528/15 |
| 4,981,728 | 1/1991 | Homma et al. | 427/386 |

FOREIGN PATENT DOCUMENTS

| | | |
|---|---|---|
| 0050167 | 10/1980 | European Pat. Off. . |
| 0207784 | 7/1986 | European Pat. Off. . |
| 0269447 | 11/1987 | European Pat. Off. . |
| 0425104 | 1/1990 | European Pat. Off. . |
| 60-56256 | 4/1985 | Japan . |
| 61-65159 | 4/1986 | Japan . |
| 1-123145 | 5/1989 | Japan . |
| 2074892 | 4/1981 | United Kingdom . |

OTHER PUBLICATIONS

Jun Haginaka, "Synthesis of mixed–fucntional–phase silica supports for liquid chromatography and their applications to assays of drugs in serum," Dec. 28, 1990, pp. 163–172.

Chemical Abstracts, p. 101 P377, "Detection of Paramagnetic Additive".

Chemical Abstracts, P 106 P 918, "Filler for Column and Preparation Thereof".

*Primary Examiner*—Thurman K. Page
*Assistant Examiner*—Kathryne E. Shelborne
*Attorney, Agent, or Firm*—Sprung Horn Kramer & Woods

[57] ABSTRACT

A packing material for a column comprises a porous support coated with silicone polymer having an Si—R bond, wherein R is a hydrophobic group and an Si—R' bond, wherein R' is a hydrophilic group, and a process for the production thereof.

5 Claims, 26 Drawing Sheets

Fig. 5A
Fig. 5B
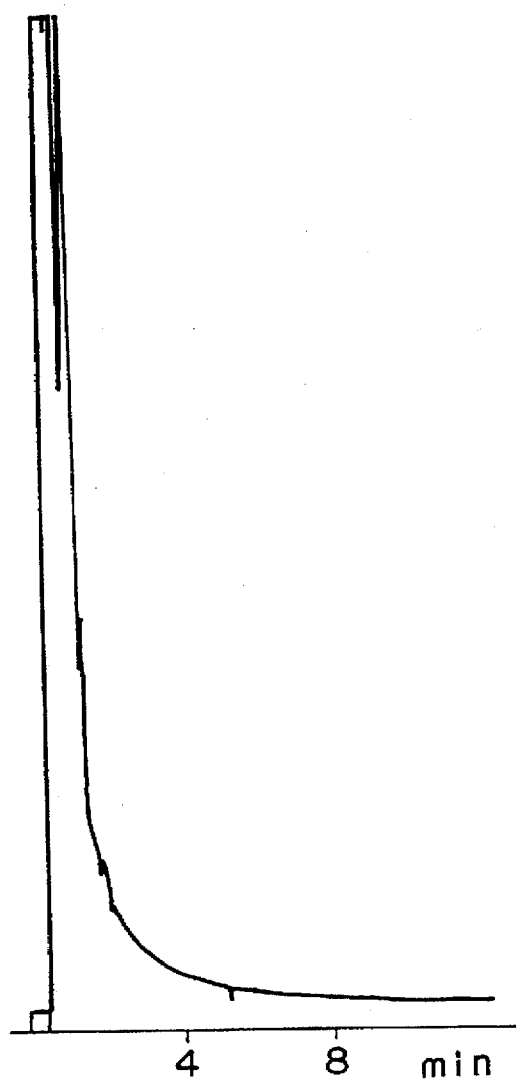
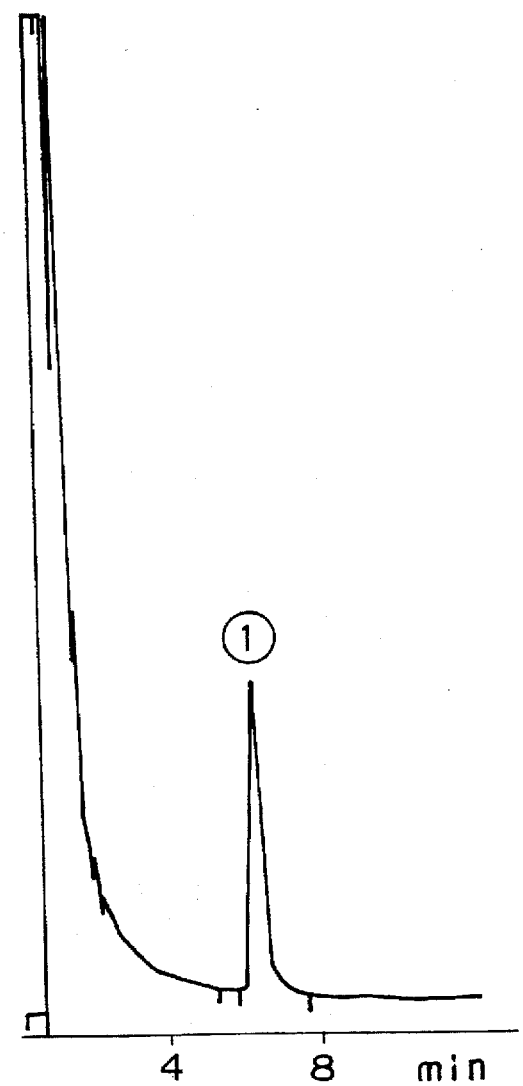

Fig. 12A
Fig. 12B
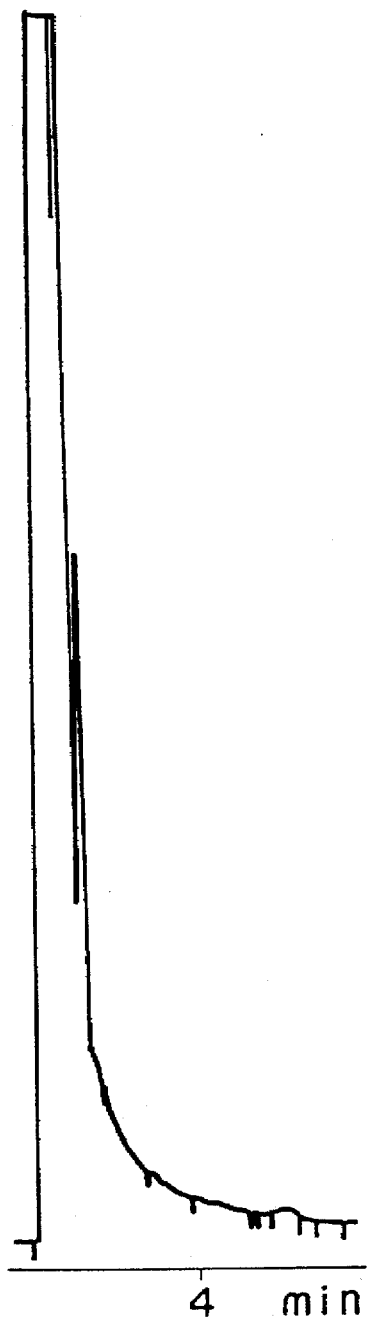
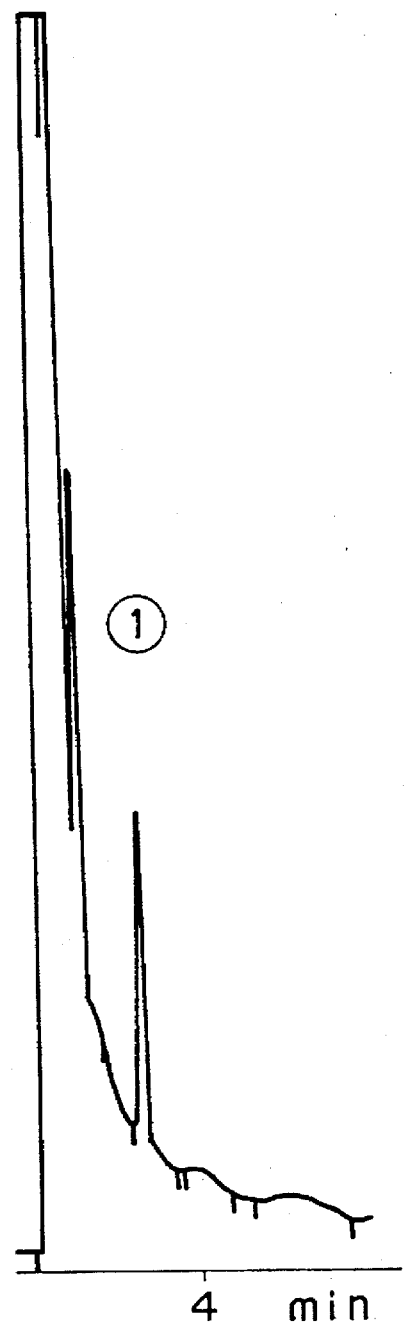

Fig. 14A
Fig. 14B
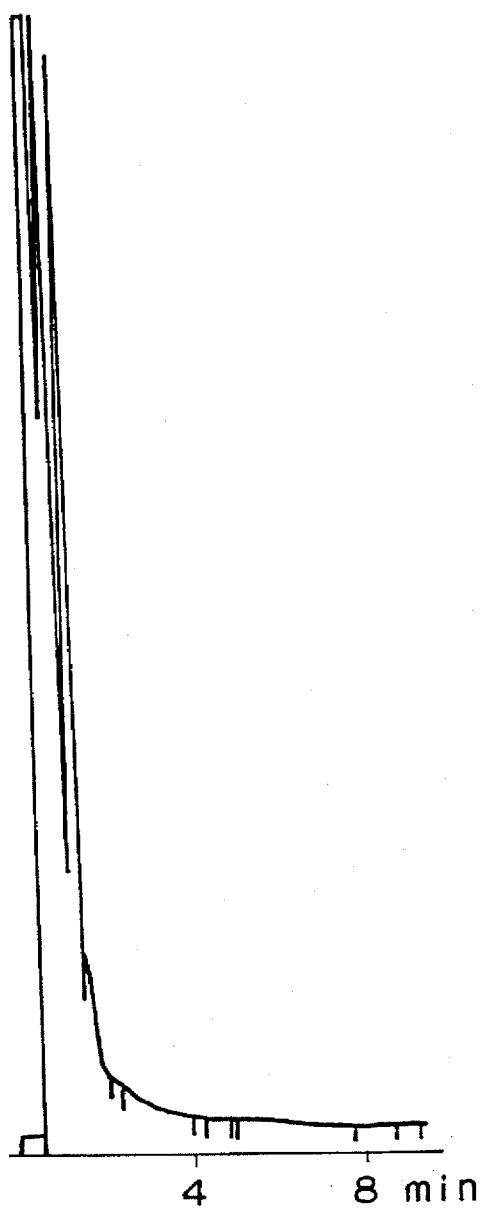
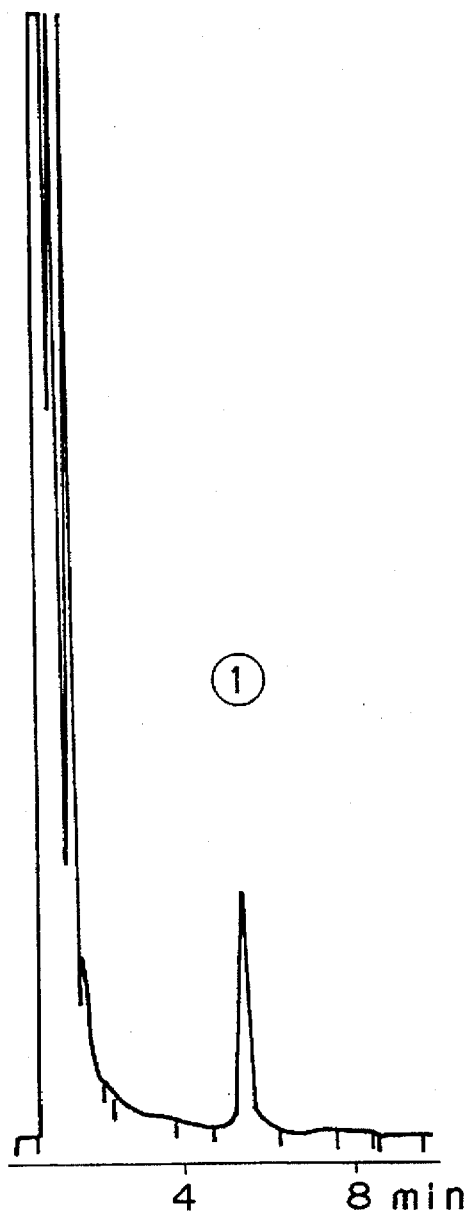

Fig. 16A
Fig. 16B
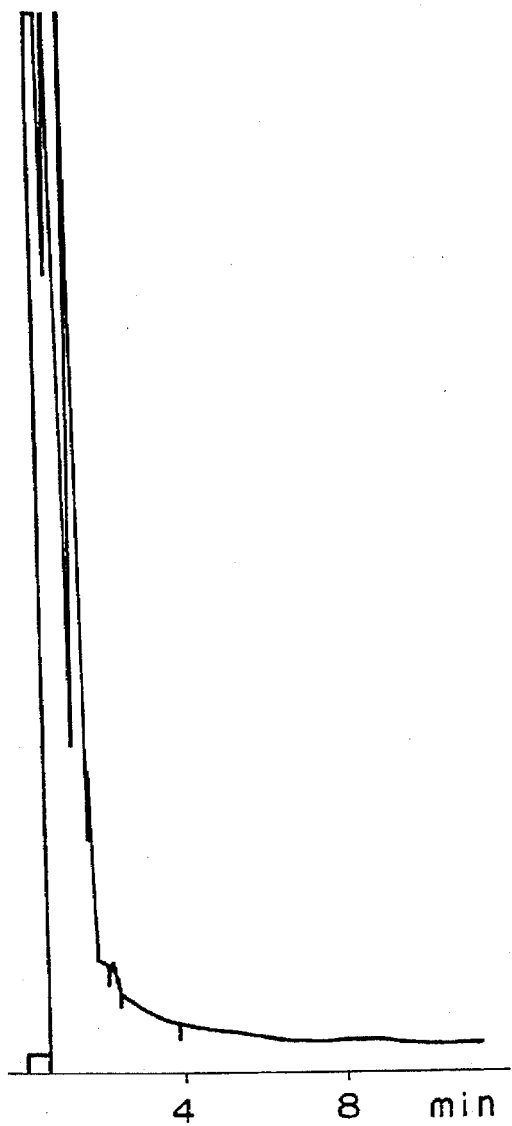
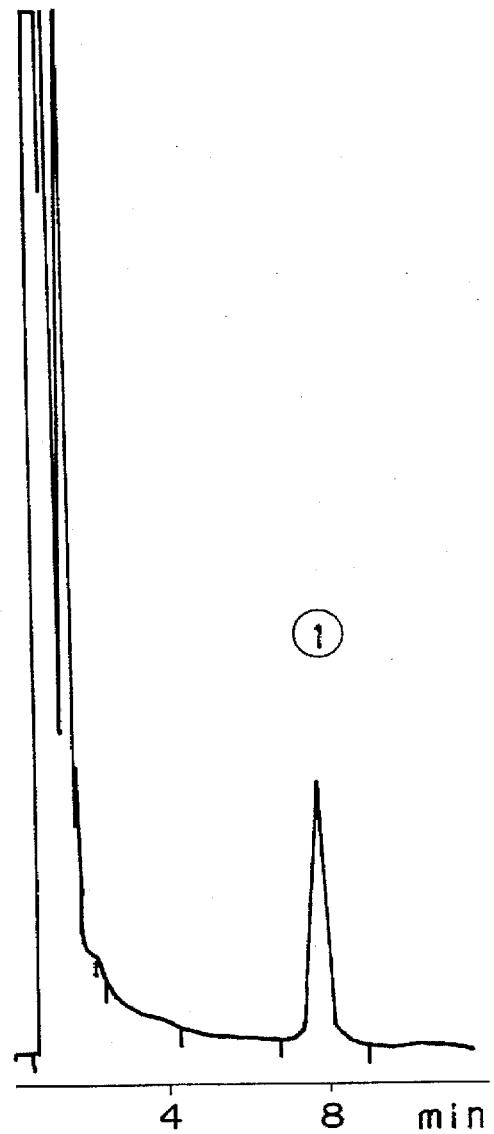

Fig. 18A
Fig. 18B
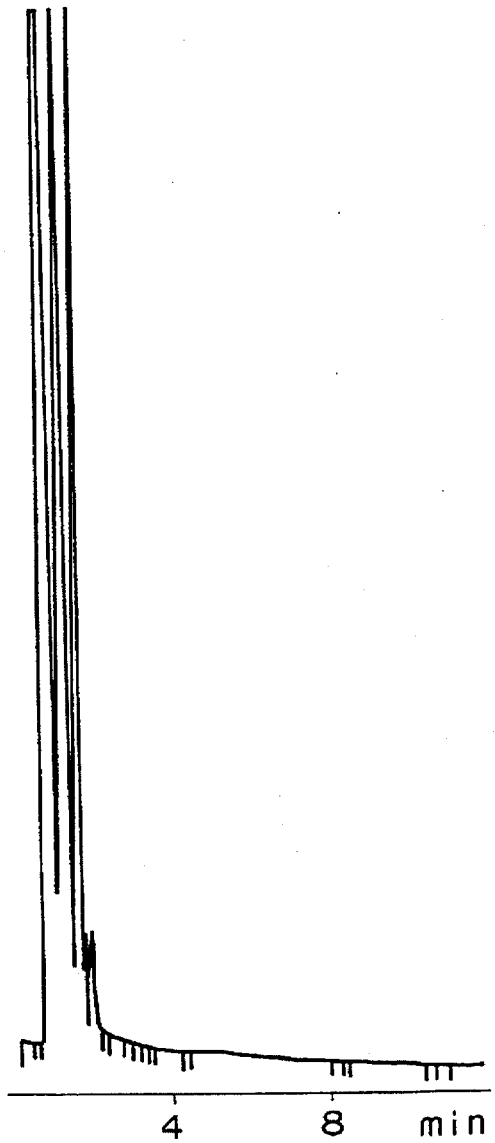
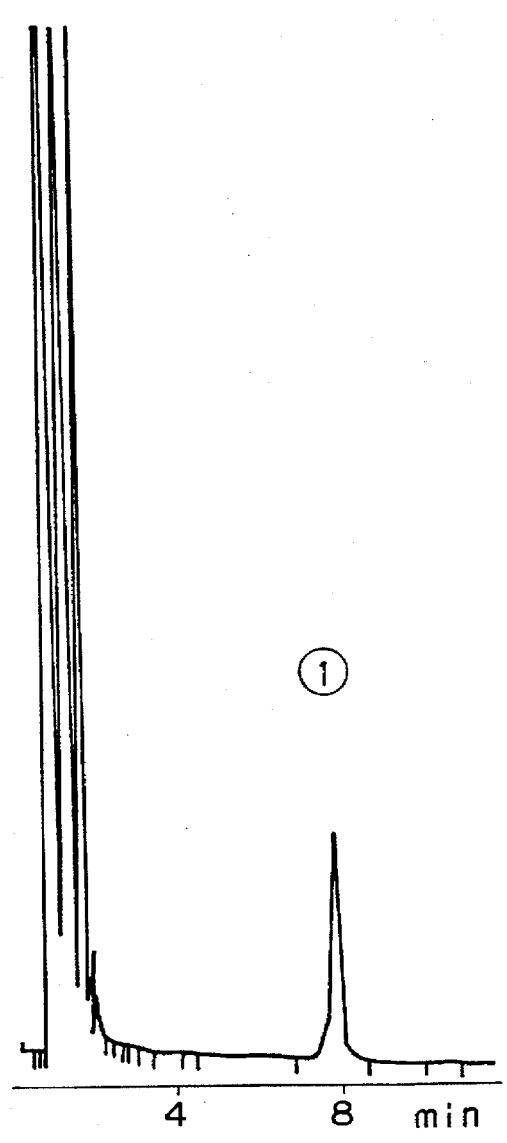

CORTIZOLE

CORTICOSTERONE

PACKING MATERIAL FOR COLUMN AND PROCESS FOR PRODUCTION THEREOF

BACKGROUND OF THE INVENTION

1. Field of the Invention

The present invention relates to a packing material for a column, and a process for the production thereof, and more particularly, relates to an improvement of the modified state of the active groups.

2. Description of the Related Art

Columns packed with packing materials have been used for a separation of various liquid samples, a liquid chromatography, especially high performance liquid chromatography (HPLC), has been frequently utilized for separation an analysis of mixed samples of various substances such as serum and industrially, packing materials for a column have been applied for a separation extraction of specific components.

In the prior art, when quantitating drugs or metabolites in biological components containing a large amount of proteinaceous substances such as serum, to solve problems caused by any adsorption of proteins onto the packing materials for a column, it has been required to practice a pre-treatment such as deprotenization, etc.

Nevertheless, such a pre-treatment operation requires enormous time and labor, and has a problem in that the analysis precision becomes poor.

Accordingly, recently there has been developed a packing material for a column that enables a direct injection of a sample containing protein components, without performing such a deprotenization, to enable a separation of the various components contained in the sample.

These packing materials for a column comprise porous glass or silica gel as the support, having different properties imparted internally or externally of the pores thereof.

The use of such packing materials ensures that proteins in a serum (albumin, globulin), which are macromolecules, will not penetrate the pores and will pass through the column as such without being adsorbed on the hydrophilic external surface (i.e., pore outer phase), while relatively smaller molecules of drugs in serum, etc., will be retained on the hydrophobic internal surface (i.e., pore inner phase), to be thus separated.

Specific examples of such packing materials include those disclosed in Japanese Unexamined Patent Publication (Kokai) No. 60-56256. In such packing materials, the external surface of the silica chemically bound with octadecylsilyl (ODS) groups is coated with a protein. The protein for coating comprises bovine serum albumin or rat plasma protein, and the packing material is obtained by adsorbing the protein onto the ODS-bound silica and denaturing same.

Among the packing materials as described above, however, the ODS-bound silica packing materials coated with protein sometimes result in an elution of the adsorbed denatured protein, when used for a long time, and a column having a high separation efficiency cannot be obtained, and as a result, several problems remain with respect to the durability and separation performance.

To solve these problems, as disclosed in Japanese Unexamined Patent Publications (Kokai) Nos. 61-65159 and 1-123145, there has been developed a method of obtaining a packing material for a column by (1) introducing hydrophobic groups into the external and internal surfaces of a porous support, (2) cleaving only the hydrophobic groups on the external surface by using an enzyme which is itself a macromolecule and cannot penetrate pores of a silica, etc., and (3) thereafter introducing hydrophilic groups to the external surface.

More specifically, in the method disclosed in Japanese Unexamined Patent Publication (Kokai) No. 61-65159, by using the porous silica gel having a glycerylpropyl group introduced therein as the starting material, an oligopeptide (glycyl-phenylaranyl-phenylalanine, etc.) is bound thereto through carbonyldiimidazole, and the phenylalanine side chain on the external surface is cleaved by carrying out a hydrolysis by using carboxypeptidaze A, which is a proteolytic enzyme.

As a result, glycyl-phenylaranyl-phenylalanine remains on the internal surface of the packing material as the hydrophobic ligand, and the external surface becomes hydrophilic glycyl-glycerylpropyl.

The method disclosed in Japanese Unexamined Patent Publication (Kokai) No. 1-123145 uses the porous silica having aminopropyl groups introduced therein as the starting material, reacts octanoyl chloride in the presence of triethylamine, introduces hydrophobic groups through the amide bond, subsequently hydrolyzes the acyl groups on the external surface with polymyxin-acylase, and converts the amino groups on the external surface to the hydrophilic groups by carrying out the reaction with glycidol.

In the methods disclosed in Japanese Unexamined Patent Publications (Kokai) Nos. 61-65159 and 1-123145, however, the steps are complicated because of the use of enzymatic reactions, and further, variations tend to occur in the characteristics of the packing materials obtained.

Also, these packing materials have problems in that the pH of the eluted solution is limited to a narrow range, and that it is difficult to obtain a stable and very reliable measurement result.

SUMMARY OF THE INVENTION

Accordingly, the objects of the present invention are to eliminate the above-mentioned disadvantages of the prior art, and to provide a packing material for a column which can be easily prepared and has a high separation performance, and a process for the production thereof.

Other objects and advantages of the present invention will be apparent from the following description.

To accomplish the above object, the present inventors made extensive studies, and consequently, found that a packing material for column having an extremely high ability of separating protein-containing samples, etc., can be obtained by modifying the surface of a porous support with a hydrophobic group and a hydrophilic group, to thus accomplish the present invention.

In accordance with the present invention, there is provided a packing material for column comprising a porous support coated with silicone polymer having an Si—R bond wherein R is a hydrophobic group and an Si—R' bond wherein R' is a hydrophilic group.

In the packing material for a column according to the present invention, the R' group is preferably a hydrophilic group having a hydroxyl group and the R group is a hydrocarbon residue having 1 to 18 carbon atoms.

In accordance with the present invention, there is also provided a process for producing the packing material for a column comprising:

a step of coating a porous support with silicone polymer, a hydrophobic modification step of bonding a hydrocarbon group R having a double bond to a part of the —SiH residues of the coated silicone polymer to form —Si—R groups, and a hydrophilic modification step of bonding a hydrophilic group R' having a double bond to at least a part of the remainder of the —SiH residues of the coated silicone polymer to form —Si—R' groups.

In accordance with the present invention, there is further provided a process for producing the packing material for a column, comprising:

a step of coating a porous support with silicone polymer, a hydrophilic modification step of bonding a hydrophilic group R' having a double bond to a part of the —SiH residues of the coated silicone polymer to form —Si—R' groups, and a hydrophobic modification step of bonding a hydrocarbon group R having a double bond to at least a part of the remainder of the —SiH residues of the coated silicone polymer to form —Si—R groups.

In accordance with the present invention, there is further provided a process for producing the packing material for a column, comprising:

a step of coating a porous support with silicone polymer, and a modification step of modifying at least a part of the —SiH residues of the coated silicone polymer with a hydrophilic group R' and hydrocarbon group R having respectively double bonds to form —Si—R' groups and —Si—R groups, In accordance with the present invention, there is further provided a process for producing the packing material for a column, comprising:

a step of coating a porous support with silicone polymer, a hydrophobic modification step of bonding a hydrocarbon group R having a double bond to a part of the —SiH residues of the coated silicone polymer to form —Si—R groups, an intermediate modification step of bonding an intermediate group having a double bond and an epoxy group at the other end to at least a part of the remainder of the —SiH residues of the coated silicone polymer, and a hydrophilic modification step of reacting the above intermediate epoxy group with glycerol group to form —Si—R' groups.

BRIEF DESCRIPTION OF THE DRAWINGS

The present invention will be better understood from the description set forth below with reference to the accompanying drawings, wherein:

FIGS. 5, 6, 7, 8 and 9 are diagrams illustrating separation states with the packing material according to Example 1 of the present invention;

FIGS. 10, 11 and 12 are diagrams illustrating separation states with the packing material according to Example 2 of the present invention;

FIGS. 13 and 14 are diagrams illustrating separation states with the packing material according to Example 3 of the present invention;

FIGS. 15 and 16 are diagrams illustrating separation states with the packing material according to Example 4 of the present invention;

FIGS. 17 and 18 are diagrams illustrating separation states with the packing material according to Example 5 of the present invention;

DESCRIPTION OF THE PREFERRED EMBODIMENTS

Figure 1A:
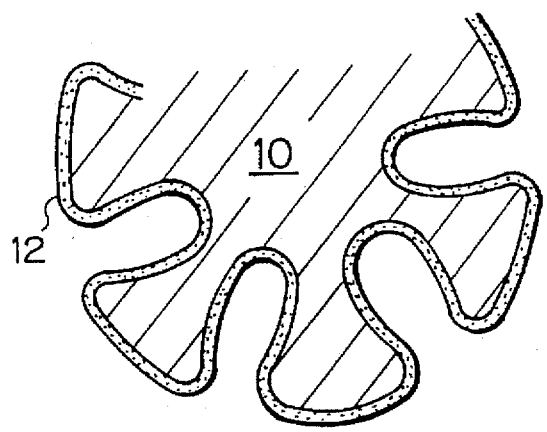
FIG. 1 is a diagram illustrating the steps of the hydrophobic modification—hydrophilic modification process according to the present invention.

The construction of the present invention is now described in detail.

Porous Support

As the porous support to be used in the present invention, for example, any desired powder generally used as the support for liquid chromatography, such as silica gel, alumina, glass beads (e.g. porous glass.), zeolite, hydroxy apatite, graphite, etc., can be used. Also, a composite powder, for example, powder having a fine inorganic powder such as silica gel, titanium dioxide or hydroxy apatite on the surface of a synthetic resin such as polyamide, acrylic resin or polyvinyl alcohol, etc., can be used.

The porous support preferably has an average particle size of 2 to 200 µm, a specific surface area of 200 to 800 m²/g, and a pore of 40 to 120 Å.

A particularly preferable porous support is a spherical or crushed type silica gel having a pore size of 60 to 80 Å, a specific surface area of 400 to 600 m²/g, and particle sizes of 3 to 50 µm.

Silicone Polymer

The silicone compound containing Si=H group to be used in the present invention is at least one compound having the formula (1):

$$(R^1HSiO)_a(R^2R^3SiO)_b(R^4R^5R^6SiO_{1/2})_c \quad (1)$$

wherein $R^1$, $R^2$ and $R^3$ are each independently hydrogen or a hydrocarbon group having 1 to 10 carbon atoms, which may be also substituted with at least one halogen atom but $R^1$, $R^2$ and $R^3$ cannot be hydrogen atoms at the same time. $R^4$, $R^5$ and $R^6$, are each independently hydrogen or a hydrocarbon group having 1 to 10 carbon atoms, which may be also substituted with at least one halogen atom, a is an integer of 0, 1 or more, b is an integer of 0, 1 or more, c is 0 or 2, when c is 0, the sum of a+b is made 3 or more.

The silicone compounds of the formula (1) consist of two kinds of groups.

The first group corresponds to the compound (1) wherein c=0, which is a silicone compound represented by the compound having the following formula (2):

wherein $R^1$, $R^2$, $R^3$, a and b have the same meanings as defined above, but preferably $R^1$, $R^2$ and $R^3$, are each independently a hydrocarbon group having 1 to 10 carbon atoms, which may be also substituted with at least one halogen atom, and the sum of a+b is 3 or more.

Representative examples of this compound are shown below.

wherein, n represents an integer of 3 to 300,

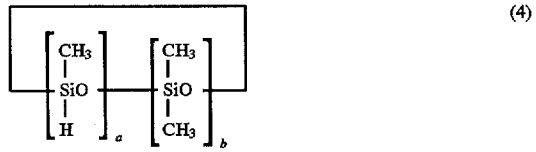

wherein, a+b=3–300.

The compounds represented by the above formula (3) and compound (4) can be used either alone or as a mixture thereof.

In each formula of the above compound (3) and compound (4), n (or a+b) is preferably 3 to 7. As the value of n is smaller, the boiling point is lowered, whereby the amount evaporated and adsorbed onto the, support will be increased. Particularly, the trimer and the tetramer are suitable because of their steric characteristics, which are susceptible to polymerization.

Specific examples of the cyclic silicone compound having the formula (2) may include dihydrogenhexamethylcyclotetrasiloxane, trihydrogenpentamethylcyclotetrasiloxane, tetrahydrogentetramethylcyclotetrasiloxane, dihydrogenoctamethylcyclopentasiloxane, trihydrogenheptamethylcyclopentasiloxane, tetrahydrogenhexamethylcyclopentasiloxane and pentahydrogenpentamethylcyclopentasiloxane.

The second group of the silicone compounds of the above formula (1) corresponds to the above compound (1) wherein c=2, which is a linear silicone compound represented by the following formula (5):

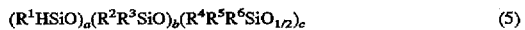

wherein $R^1$, $R^2$, $R^3$, $R^4$, $R^5$, $R^6$, a and b have the same meanings as defined above, and c is 2, but preferably $R^1$ to $R^6$ are each independently a hydrocarbon group having 1 to 10 carbon atoms which may be also substituted with at least one halogen atom.

Representative examples of this compound may include the compounds having the formula (6):

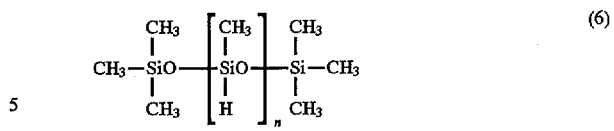

wherein n is an integer of 2–100.

Specific examples of the linear silicone compound of the above formula (6) may include 1,1,1,2,3,4,4,4-octamethyltetrasiloxane, 1,1,1,2,3,4,5,5,5-nonamethylpentasiloxane and 1,1,1,2,3,4,5,6,6,6-decamethylhexasiloxane.

The silicone compound of the above formula (1) is brought into contact with the above porous support in either a gas phase state or a liquid phase state.

The contact under a gas phase state (i.e., gas phase treatment) may be carried out by, for example, using a sealed vessel according to a process in which the vapor of the above silicone compound in a molecular state is brought into contact with a surface of the porous support at a temperature of 120° C. or lower, preferably 100° C. or lower, under a pressure of preferably 200 mmHg or lower, more preferably 100 mmHg or lower, or a process in which a gas mixture of the above silicone compound and the support gas is brought into contact with the support at a temperature of 120° C. or lower, preferably 100° C. or lower. Examples of suitable silicone compounds for this gas phase treatment are tetrahydrotetraethylcyclotetrasiloxane and tetrahydrotetramethylcyclotetrasiloxane.

Further, the contact under a liquid phase state (i.e., liquid phase treatment) may be carried out by, for example, adding a 1 to 50% by weight of the silicone compound solution dissolved in a volatile solvent capable of dissolving the above silicone compound such as benzene, dichloromethane, chloroform, etc., above all hexane to the support in an amount of 0.01 to 1 part by weight of the silicone compound per 1 part by weight of the support. In this case, the addition is preferably done under stirring.

The surface polymerization of the silicone compound on the support surface can be carried out by leaving the support after the above contact treatment to stand, or stirring same at a temperature of 50° to 200° C. for 2 hours or longer.

Since this surface polymerization is accelerated by the action of the surface active sites of the support itself, it is not particularly necessary to add a catalyst, Here, "active sites" refer to the site capable of catalyzing the polymerization of a silicone compound having a siloxane bond (Si—O—Si) or Si—H group (i.e., hydrosilyl group) and means, for example, the acidic point, basic point, oxidation point or reduction point. The surface polymerization is carried out until the active sites of the support surface are covered with the coating of the silicone polymer. When the activity of the support itself is very weak, the polymerization may be also carried out after adding suitably an alkali catalyst such as sodium hydroxide, potassium hydroxide, lithium hydroxide, ammonium hydroxide, calcium hydroxide, etc., or an alkyl metal catalyst such as dibutyl tin, etc., to the support after or before the above contact treatment.

The silicone polymer coating coated on the support surface has two kinds of structures. More specifically, in the case of the silicone polymer, the polymerization of which occurs through a cleavage and recombination of siloxane bond (—Si—O—Si), this has only the chain structure of —Si—O—Si— units, but when the polymerization occurs through the mutual crosslinking reaction between the hydrosilyl bonds (Si—H) in the presence of $H_2O$ or $O_2$, the silicone polymer will include a network structure having the unit of $$-O-\underset{\underset{|}{O}}{\overset{|}{Si}}-O-$$

derived from the following reaction scheme, $$2\text{-}O-\underset{\underset{H}{|}}{\overset{R}{\overset{|}{Si}}}-O- \;+\; 2H_2O \longrightarrow$$

$$2\text{-}O-\underset{\underset{OH}{|}}{\overset{R}{\overset{|}{Si}}}-O- \;+\; 2H_2\uparrow \longrightarrow$$

$$-O-\underset{\underset{\underset{\underset{R}{|}}{\overset{|}{Si}}}{\overset{|}{O}}}{\overset{R}{\overset{|}{Si}}}-O- \;+\; H_2O$$

$$-O-\underset{|}{\overset{|}{Si}}-O-$$

The two different types of polymerizations as mentioned above each will proceed alone in some cases, or simultaneously in other cases, depending on the kind of support or the reaction conditions (e.g., temperature, catalyst, etc.). The extent of polymerization also will vary widely.

As described above, in the present invention, since a silicone compound with a low molecular weight is brought into contact with the support, the silicone compound will penetrate the fine pores of the support and be polymerized as attached or adsorbed on substantially all of the surface of the powder, to form a very thin coating of the silicone polymer (3 to 30 Å of coating) on the support, whereby the porosity of the support is substantially maintained in the original state. This porosity will not be impaired by a subsequent addition of vinyl compounds, etc.

The molecular weight (i.e., weight average molecular weight) of the silicone polymer formed on the support surface by the polymerization reaction as described above is 150,000 or more. In the case of a silicone compound, however, it will become difficult to solubilize in water or an organic solvent, as the molecular weight becomes higher by polymerization, and therefore, the polymer cannot be extracted for a measurement of the molecular weight, and further, it is impossible to measure the molecular weight of the polymer while coated on the support surface.

Accordingly, the polymers at the respective stages during progress of polymerization were extracted with chloroform and the molecular weights of the polymers were determined as calculated on polystyrene. As a result, it was confirmed that there exists a polymer of 150,000 at maximum. Therefore, although it is certain that the polymer is sufficiently polymerized to a state such that it cannot be extracted with chloroform has a molecular weight of more than 150,000, it is difficult to confirm the molecular weight in more detail.

Hydrophobic Group

Further, unreacted Si—H groups remain in the silicone polymer coated on the support surface, and reacting hydrocarbon having a vinyl group in the molecule with the Si—H groups, a silicone polymer having a Si—C bond can be formed.

As the above-mentioned vinyl compound, for example, the compounds having the following formula can be used:

$$R^8\text{-CH=CH-}R^9$$

wherein $R^8$ and $R^9$ each independently represent a hydrogen atom, an alkyl group having 1 to 40 carbon atoms, a cycloalkyl group or cycloalkenyl group having 4 to 8 carbon atoms, or an aryl group, which may be also substituted with an alkyl having 1 to 20 carbon atoms.

The vinyl compound represented by the above formula may be either one compound of ethylene where both $R^8$ and $R^9$ are hydrogen atoms, a vinyl compound where either one of $R^8$ and $R^9$ is a hydrogen atom and the other is a substituent other than a hydrogen atom, for example, α-olefin compound, a symmetric type vinyl compound where both $R^8$ and $R^9$ are the same substituents other than a hydrogen atom, or an asymmetric type vinyl compound where $R^8$ and $R^9$ are different substituents other than hydrogen atom.

Preferable vinyl compounds are those of the above formula wherein $R^8$ and $R^9$ each independently represent a hydrogen atom; an alkyl group having 4 to 20 carbon atoms such as a 1-hexyl group, 1-octyl group, 1-decyl group, 1-dodecyl group, 1-hexadecyl group or 1-octadecyl group; cyclohexyl group or cyclohexenyl group; a phenyl group or naphthyl group; or a phenyl group or naphthyl group substituted with a lower alkyl group having 1 to 4 carbon atoms.

By an addition of vinyl compounds wherein $R^8$ is a hydrogen atom and $R^9$ is an ethyl group, hexyl group, hexadecyl group or phenyl group, chemically bound type fillers of the prior art corresponding respectively to the $C_4$-type, $C_8$-type, $C_{18}$-type or phenyl type can be obtained.

The reaction between the above vinyl compound and the above silicone polymer coated powder can be carried out by, for example, by bringing both into contact in the presence of a solvent, at 50° to 300° C., in a gas phase or liquid phase, for 2 hours or longer. As the catalyst, platinum group catalysts, i.e., compounds of ruthenium, rhodium palladium, osmium, iridium or platinum, are suitable. Particularly, palladium compounds and platinum compounds are preferred.

This reaction can be confirmed by a diffusion reflection spectrum by an FT-IR apparatus. Namely, the absorption of the Si—H group at 2.160 cm$^{-1}$ has a greatly reduced intensity due to an addition of the vinyl compound, and instead there newly appears an absorption based on the alkyl group at 2,800 cm$^{-1}$ to 3,000 cm$^{-1}$. Therefore, by determining the absorption ratio, the reflectance can be calculated.

Hydrophilic Group

To obtain the packing material for liquid chromatography according to the present invention, a part of the Si—H groups on the surface of the silicone polymer coated support obtained as described above must be made hydrophilic.

Here, as the hydrophilic group, tetraol shown in the following compound 10 may be employed.

$$CH_2CH-CH_2OCH_2CH-CH_2-O-CH_2CHCH_2OCH_2CHCH_2OH$$
$$\phantom{CH_2CH}|\phantom{-CH_2OCH_2CH-CH_2-O-CH_2CH}|\phantom{CH_2OCH_2CH}|$$
$$\phantom{CH_2CH}OH\phantom{-CH_2OCH_2CH-CH_2-O-CH_2CH}OH\phantom{CH_2OCH_2C}OH$$

The tetraol is synthesized as follows.

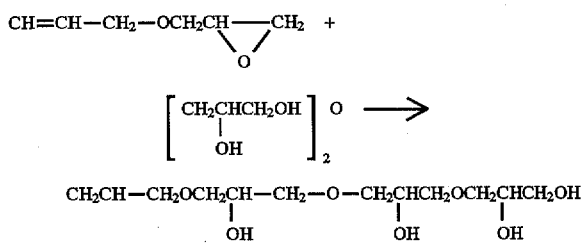

Here, by changing diglycerin to polyglycerin, a polyol is formed, and this can be also used as the hydrophilic group of the present invention.

Furthermore, as the hydrophilic group, the following polyoxyethylene allyl ether can be preferably used.

 (12)

wherein n is an integer of, preferably 5 to 30, more preferably 10 to 20. The above polyoxyethylene allyl ether can be prepared as follows.

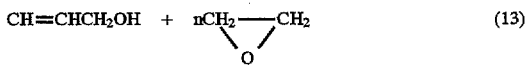 (13)

The packing material obtained as described above is different in type from the paching material of the prior art characterized by the chemically bound type, and the available pH range is as broad as 2 to 10, can be used in an alkaline solvent which cannot be used for the packing materials of the prior art, and has a good stability.

Also, when quantitating drugs or metabolites in the biological fluid such as plasma, etc., by HPLC, using the packing material of the present invention, an analysis with a good precision is possible even when the biological component is directly injected without a cumbersome pretreatment.

The packing material obtained according to the present invention is of the complete polymer-coated type, using no Lewis acid, and therefore, can elute basic substances such as 2-ethylpyridine and N N'-dimethylaniline, etc.

Hydrophobicity Modification—Hydrophilicity Modification Process

The packing material according to the present invention can be prepared according to a process in which the porous support coated with the silicone polymer is modified to be first hydrophobic and then hydrophilic.

Namely, as shown in FIG. 1(A), the surface of the porous support 10 is coated with the silicone polymer (12) according to the process as described above. In this case, the Si—H groups possessed by the silicone single substance are used in polymerization, but all thereof will be not consumed.

Figure 1B:
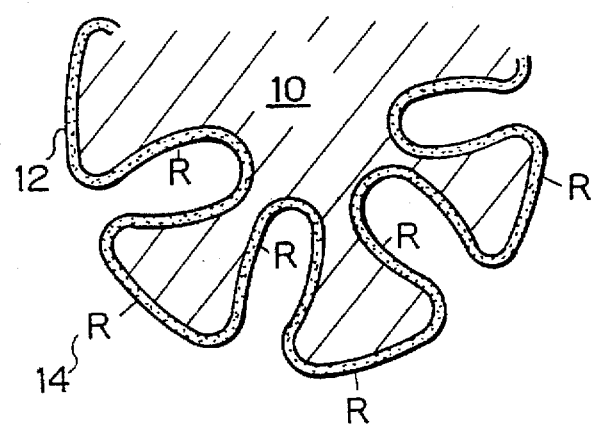

As shown in FIG. 1(B), the —SiH groups remaining in the silicone polymer 12 are allowed to react with the hydrophobic group R having a double bond, to form —SiR groups 14. Here, if all of the —SiH groups of the silicone polymer 12 are converted to —SiR groups, no subsequent introduction of hydrophilic group will be effected, and therefore, the amount of the hydrophobic group R added or the reaction conditions should be determined depending on the purpose.

Figure 1C:
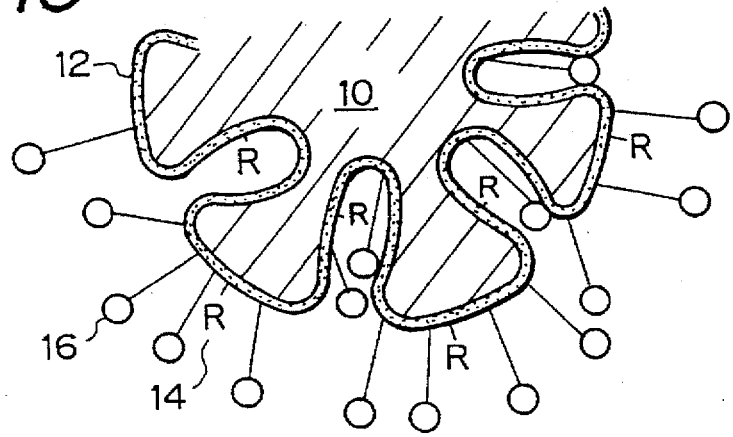

Next, as shown in FIG. 1(C), the unreacted —SiH group of the silicone polymer 12 are allowed to react with the hydrophilic group R' having a double bond 16 (shown by o- in the figures) to form hydrophilic —SIR' groups.

The surface of the silicone polymer 12 becomes a mixed function structure modified by the hydrophobic groups R and the hydrophilic groups R', whereby a specific elution characteristic can be obtained depending on the modification ratio of both groups, etc.

The hydrophobic modification—hydrophilic modification process can easily control an introduction of the hydrophobic group, which has particularly large influence on the retention, and therefore, has the advantage that the size of retention can be controlled by controlling the amount of the hydrophobic groups introduced.

Hydrophilic Modification—Hydrophobic Modification Process

The packing material according to the present invention also can be prepared according to a process in which the porous support coated with the silicone polymer is modified to be first hydrophilic and then hydrophobic.

Figure 2A:
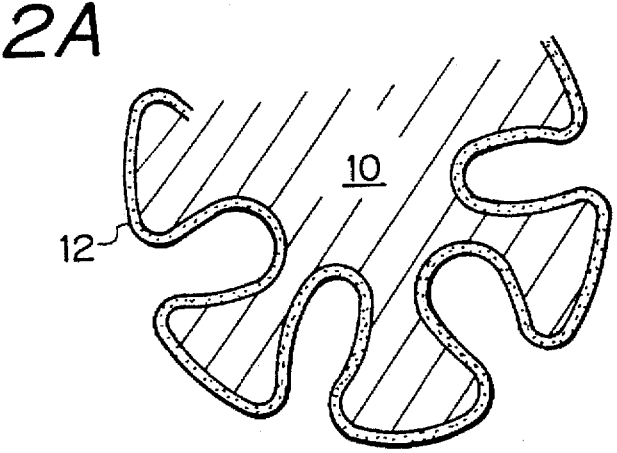
FIG. 2 is a diagram illustrating the steps of the hydrophilic modification—hydrophobic modification process according to the present invention.

That is, as shown in FIG. 2(A), the surface of the porous support 10 is coated with the silicone polymer 12.

Figure 2B:
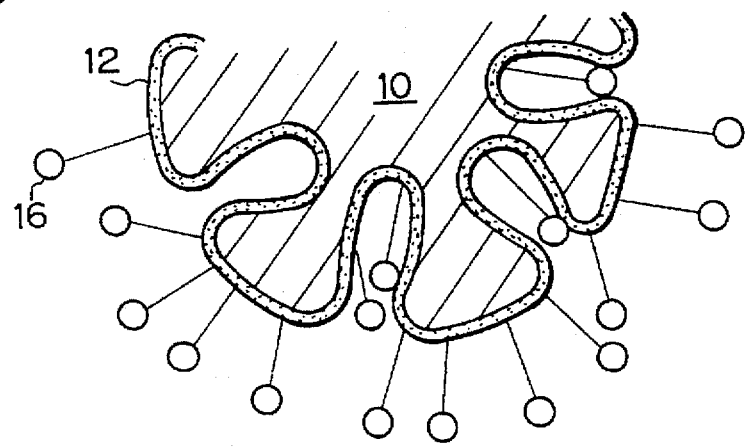

As shown in FIG. 2(B), the —SiH groups remaining in the silicone polymer 12 are allowed to react with the hydrophilic group R' having a double bond 16 (shown by o- in the figure) 16 to form —SIR' groups 16. Here, if all of the —SiH groups of the silicone polymer 12 are converted to —SiR' groups 16, no subsequent introduction of hydrophobic group will be effected, and therefore, the amount of the hydrophilic group R' or the reaction conditions should be determined depending on the purpose.

Figure 2C:
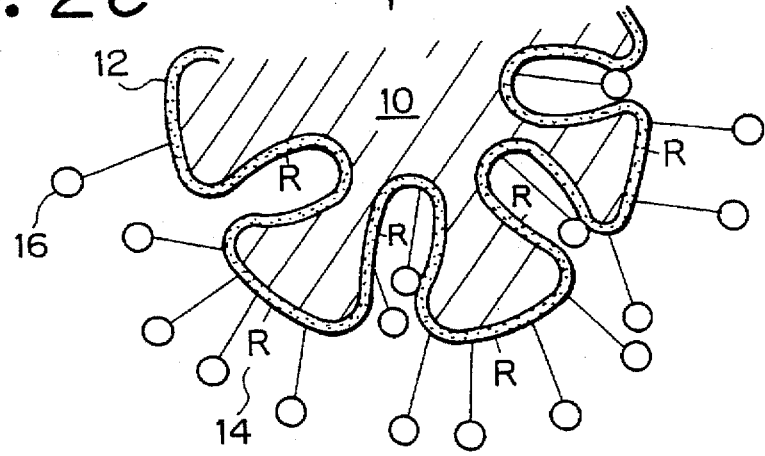

Next, as shown in FIG. 2(C), the unreacted —SiH groups of the silicone polymer 12 are allowed to react with the hydrophobic group R having a double bond to form hydrophobic —SiR groups 14.

The hydrophilic modification—hydrophobic modification process performs the hydrophilic modification thereof, and therefore, the degree of hydrophilic modification is high with little absorption of protein. The hydrophilic modification reaction is desirably conducted in water, but the silica gel coated with the silicone polymer has a water repellancy, and therefore, the reaction will proceed from the external pore surface. Accordingly, the external pore surface may be considered to be more hydrophilic than the internal pore surface, and thus the hydrophobic modification may be considered to occur relatively more readily at the internal portion than at the external portion.

Hydrophobic—Hydrophilic Modification Simultaneous Treatment Process

The packing material according to the present invention can be also prepared according to a process in which the porous support coated with the silicone polymer is subjected to the hydrophobic modification and the hydrophilic modification at the same time.

Figure 3A:
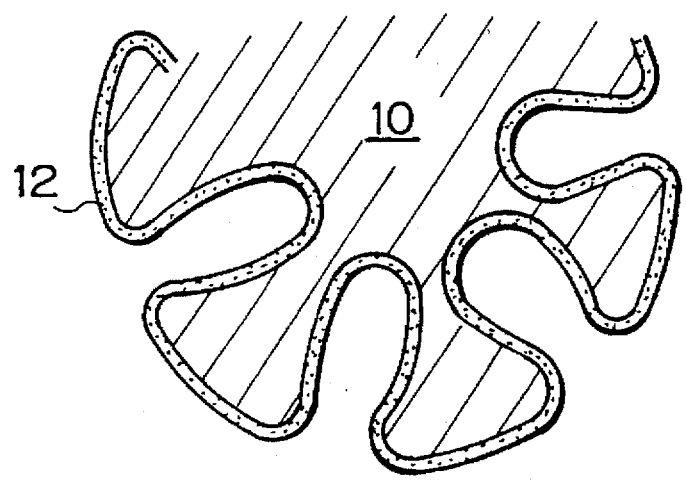
FIG. 3 is a diagram illustrating the steps of the simultaneous hydrophobic and hydrophilic modification process according to the present invention.

Namely, as shown in FIG. 3(A), the surface of the porous support 10 is coated with the silicone polymer 12.

Figure 3B:
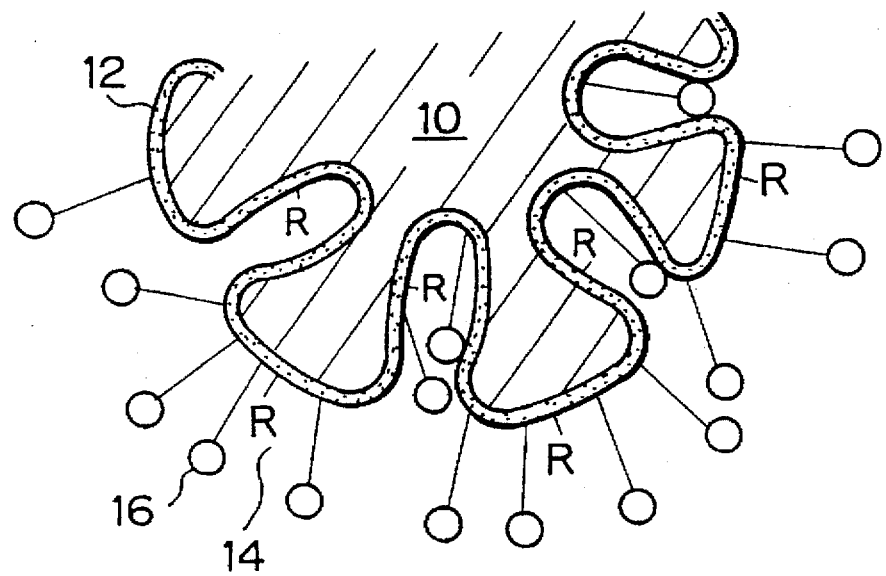

As shown in FIG. 3(B), the —SiH group remaining in the silicone polymer 12 is allowed to react with the hydrophobic group R having a double bond at the terminal end, and the hydrophilic group R' having a double bond at the terminal end (shown by o- in the figure) to form hydrophobic —SiR groups 14 and hydrophilic —SIR' groups 16.

The hydrophobic—hydrophilic modification simultaneous treatment process has an advantage in that a one-time reaction may be made. By making the amount added of the compound of relatively hydrophobic group (styrene, etc.) smaller than that of the compound of the relatively hydrophilic group (i.e., tetraol,. etc.), the desired packing material can be obtained according to the difference in reactivity (the hydrophobic compound is less bulky than the hydrophilic compound and may be considered to have a higher reactivity). As the solvent, alcohols are desirable (it is also possible to mix styrene, tetraol, etc., at the same time).

Hydrophobic Modification—Epoxidation—Hydrophilic Modification Process

The packing material of the present invention can be prepared by a process in which the porous support coated with the silicone polymer is modified first to be hydrophobic, then an epoxy compound having epoxy group is introduced, and the hydrophilic modification is effected by binding a hydrophilic group to said terminal epoxy group.

Figure 4A:
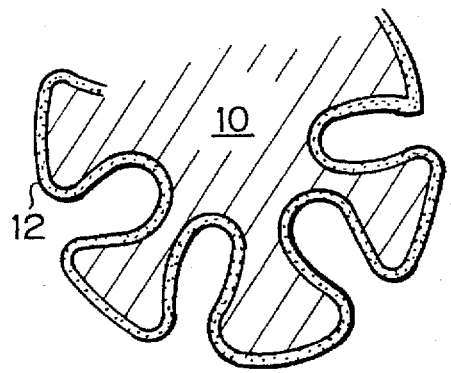
FIG. 4 is a diagram illustrating the steps of the hydrophobic modification—epoxidation—hydrophilic modification process according to the present invention.

Namely, as shown in FIG. 4(A), the porous support 10 is coated with the silicone polymer 12 according to the process as described above.

Figure 4B:
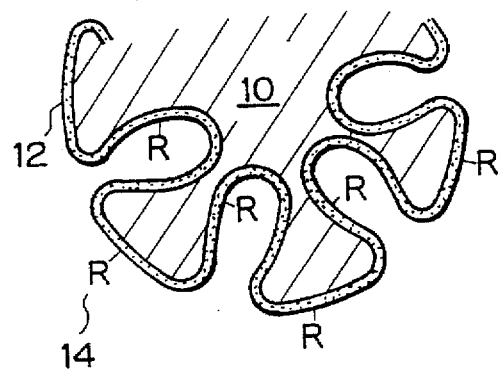

As shown in FIG. 4(B), the —SiH groups remaining in the silicone polymer 12 are allowed to react with the hydrophobic groups R having a double bond to form —SiR groups 14. Here, if all of the —SiH groups of the silicone polymer 12 become —SiR groups, no subsequent introduction of the hydrophilic group will be effected, and therefore, the amount of the hydrophobic group R or the reaction conditions should be determined depending on the purpose.

Figure 4C:
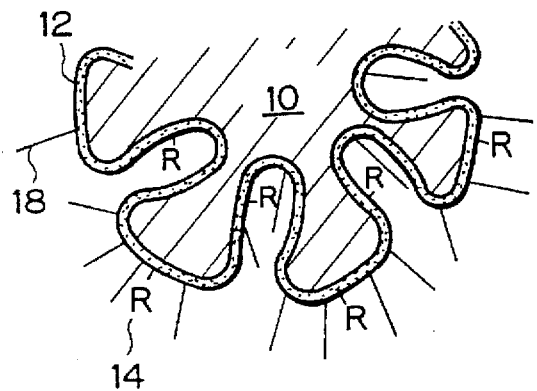

Next, as shown in FIG. 4(C), the unreacted —SiH groups in the silicone polymer 12 are allowed to react with the epoxy compound 18 having a double bond and epoxy group. Consequently, the epoxy compound is bound to the silicone polymer at the double bond end, whereby the silicone polymer has an epoxy group.

Figure 4D:
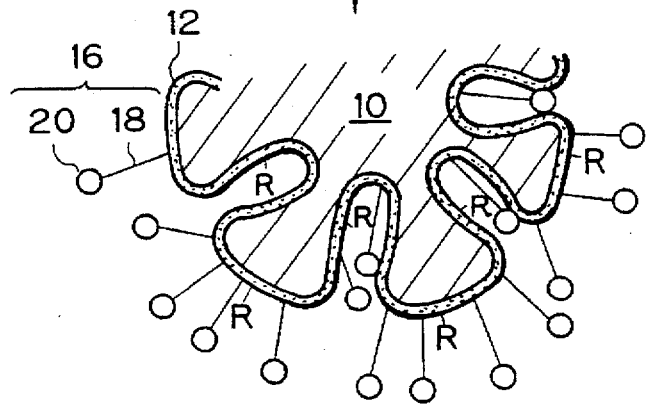

Next, as shown in FIG. 4(D), by the reaction of the hydrophilic group (shown by o- in the figure) 20, hydrophilic —SIR' groups 16 are formed.

The hydrophobic modification-epoxidation-hydrophilic modification process can make the hydrophilic modification density greater by previously introducing hydrophobic groups, and then first introducing a group which is not so bulky as tetraol, such as allyl glycidyl ether (having double bond at one end and epoxy group at the other end), and further, reacting glycerin, diglycerin, etc., whereby the recovery of protein will be increased.

For example, first a hydrophobic group (phenyl group, $C_8$, $C_{18}$) is introduced, then allyl glycidyl ether (having a double bond at one end, and an epoxy group preferably at the other end) is bound, and a compound having —OH or —COOH group such as diglycerin, glycerin, etc., is bound to the epoxy group.

The reactions of the hydrophobic group and the compound having a double bond at the end such as allyl glycidyl ether with Si—H group are carried out with the use of platinic acid as the catalyst (i.e., hydrosilylation). On the other hand, for the reaction of epoxy group with diglycerin, etc., Lewis acids, quaternary ammonium salts, tertiary amines may be employed. It is also sufficient if, after the addition of allyl glycidyl ether, the epoxy ring is subjected to opening in an acidic solution, to make it the diol type.

EXAMPLES

The present invention will now be further illustrated in detail by, but is by no means limited to the following Examples, wherein "percentages" are all by weight unless otherwise noted.

Example 1

Packing Material Prepared by Hydrophobic Modification Treatment-Hydrophilic Modification Treatment Preparation process An amount 10 g of spherical silica gel powder having pores each with a diameter of about 60 Å and an average particle size of 5 μm and 2 g of a cyclic silicone compound (in the above compound (1), one wherein $R_1=CH_3$, a=3–5, b=0, c=0) were taken into separate sealed vessels which were connected together, and subjected to an interfacial polymerization by nitrogen bubbling the cyclic silicone compound, to thereby bring the compound into contact with the silica gel powder surface in a gas phase state.

Then, the silica gel powder was taken out of the vessel, and heated in a thermostatic tank at 105° C. for 1 hour.

After cooling, 10 g of the powder was taken into a 3-necked flask of 200 ml, and to the powder was added a reaction mixture of 40 ml of toluene, 1 mg of tri-n-butylammonium salt of chloroplatinic acid as the catalyst, 118.4 mg of styrene (hydrophobic group R) (corresponding to 3% (molar ratio) relative to the moles of the Si—H groups), and 10 mg of p-t-butylcatechol (polymerization inhibitor of styrene), and the mixture was heated under reflux in an oil bath at 120° C. for 5 hours, and then filtered through a glass filter (G-4), and further, thoroughly washed with toluene and acetone, followed by drying in a thermostatic tank of 105° C. for 1 hour.

Subsequently, 10 g of the resultant powder and 1 mg of chloroplatinic acid as the catalyst were taken into a 3-necked flask of 500 ml, and this were added 100 ml of water and 10 g of tetraol (hydrophilic group R'), followed by heating under reflux in an oil bath for 4 hours. The mixture was filtered by a glass filter, washed thoroughly with water and acetone, and thereafter, dried in a thermostatic tank of 105° C. for 1 hour to give a packing material for liquid chromatography according to this Example.

Elution Example 1—1

An amount 1.5 g of the packing material according to Example 1 was packed into a column made of stainless steal of 4.6 mm in inner diameter and 10 cm in length by using a packer and a pump according to the equilibrium slurry method to prepare a packed column.

The column was used for an examination of a separation of a rat Control plasma (Sample A) and the rat Control plasma to which carbamazepine (10 μg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carrier out at 285 nm. The injected amount was 10 μl.

FIG. 5 shows the chromatogram obtained.

FIG. 5 (A) indicates the elution state of Sample A, showing the peak of the rat plasma protein eluted immediately after injection.

FIG. 5 (B) indicates Sample B, showing that the peak of carbamazepine (1) eluted after the rat plasma protein was thoroughly separated from the plasma component.

Elution Example 1-2

The packing material according to Example 1 was packed into a column made of stainless steel and 4.6 mm in inner diameter and 10 cm in length, by using a packer and a pump according to the equilibrium slurry method, to prepare a packed column.

The column was used for an examination of a separation of a rat Control plasma (Sample A) and the rat Control plasma to which phenytoin (40 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 254 nm. The injected amount was 10 µl.

FIG. 6 shows the chromatogram obtained.

Figure 6A:
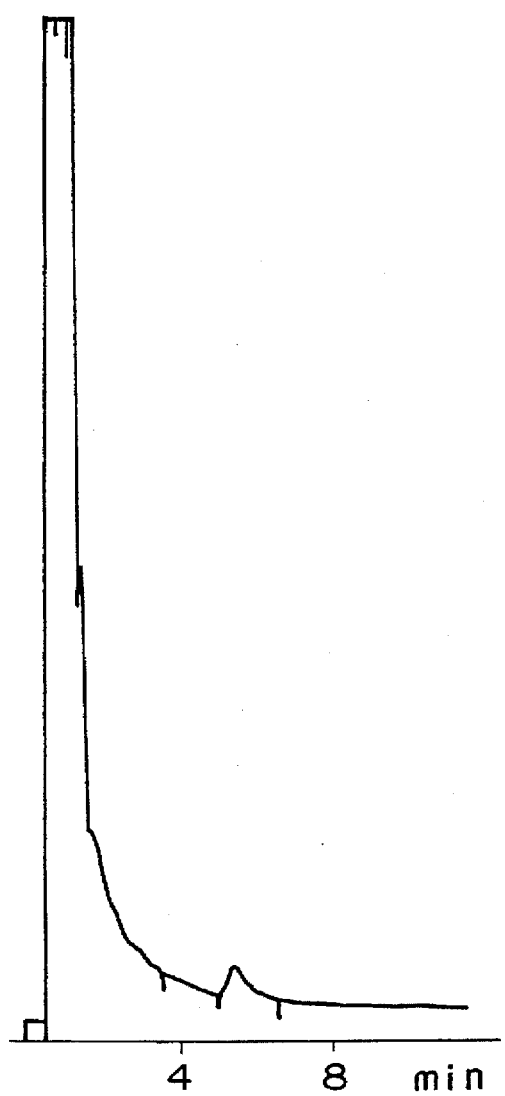

FIG. 6(A) indicates Sample A, showing the peak of the rat plasma protein eluted immediately after injection.

Figure 6B:
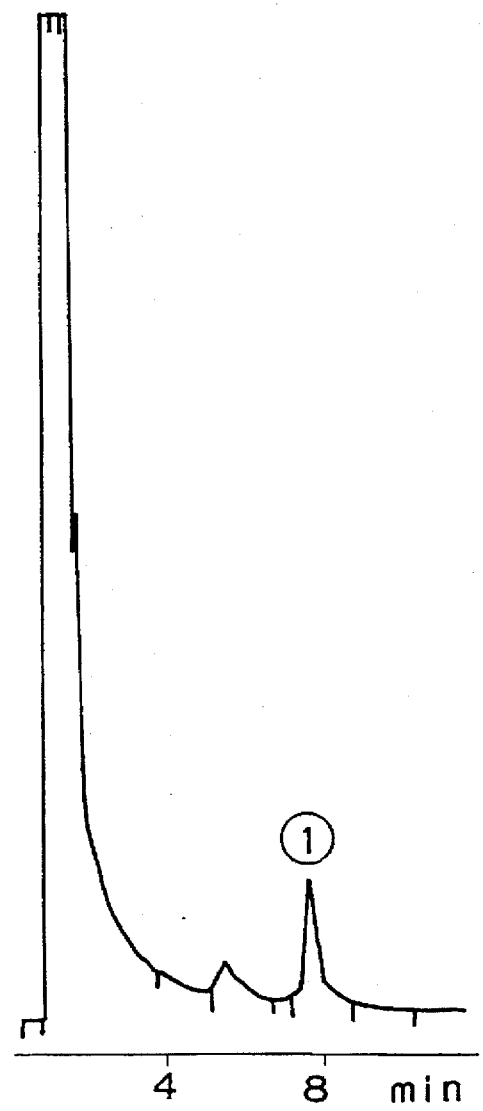

FIG. 6(B) indicates Sample B, showing that the peak of phenytoin (1) eluted after the rat plasma protein was thoroughly separated from the plasma component.

Elution Example 1-3

The packing material according to Example 1 was packed into a column made of stainless steel and 4.6 mm in inner diameter and 15 cm in length, by using a packer and a pump according to the equilibrium slurry method, to prepare a packed column.

The column was used for an examination of a separation of a rat Control plasma (Sample A) and the rat Control plasma to which theophylline (10 µg/ml) and caffeine (10 µg/ml) were added as the standard (Sample B). The mobile phase was 100 mM $NaH_2PO_4$-100 mM $Na_2HPO_4$—$CH_3CN$ (47.5-47.5-5) delivered as 1.0 ml/min. and detection was carried out at 270 nm. The injected amount was 10 µl.

Figure 7A:
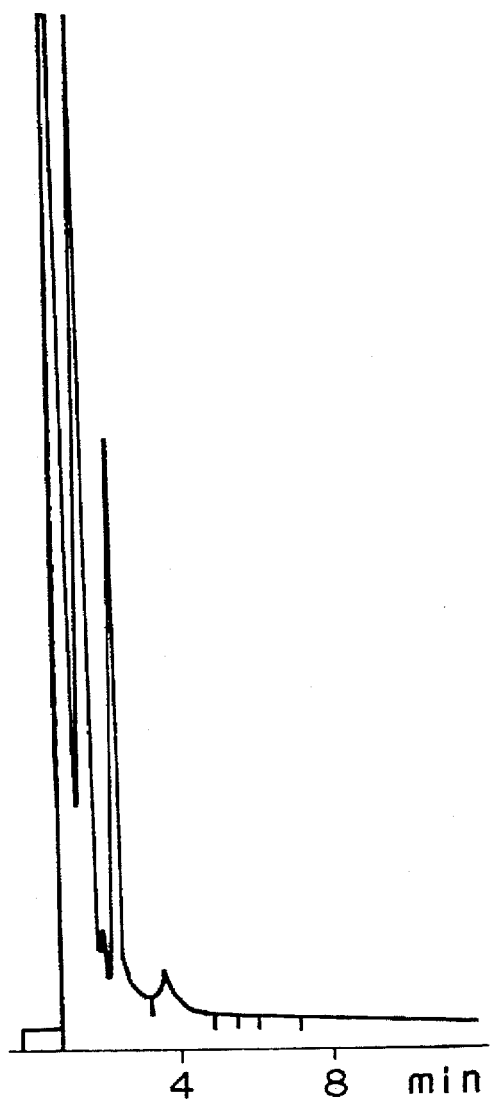
Figure 7B:
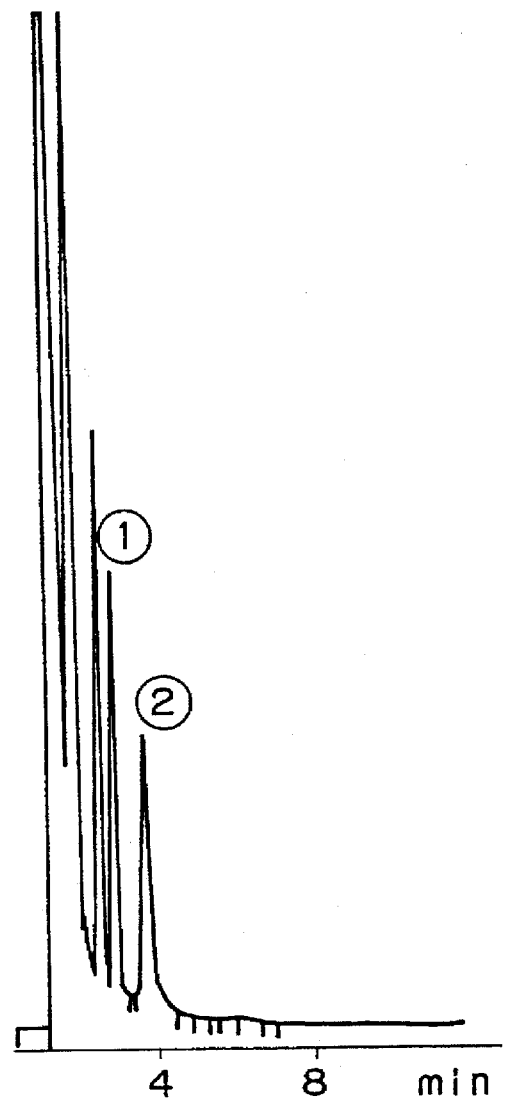

FIG. 7 shows the chromatogram obtained.

FIG. 7 (A) indicates Sample A, showing the peak of the rat plasma protein eluted immediately after injection.

FIG. 7 (B) indicates Sample B, showing that the peak of theophylline (1) and caffeine (2) eluted after the rat plasma protein was thoroughly separated from the plasma component.

Investigation of styrene content

In the foregoing Example 1, the moles of Si—H groups are calculated by carrying out elemental analysis of the silica gel coated with the silicone polymer, and the styrene content (moles) is determined, which corresponds to 3% of the moles of Si—H groups obtained.

It should be noted that the addition ratio cannot be constantly kept at this value because the amount of Si—H groups will vary depending on the reaction conditions for coating of the silicone polymer. Generally speaking, however, under the conditions mentioned above, the amount of styrene added is in the range of from 100 mg to 400 mg.

Figures 8A, 8B, 8C:
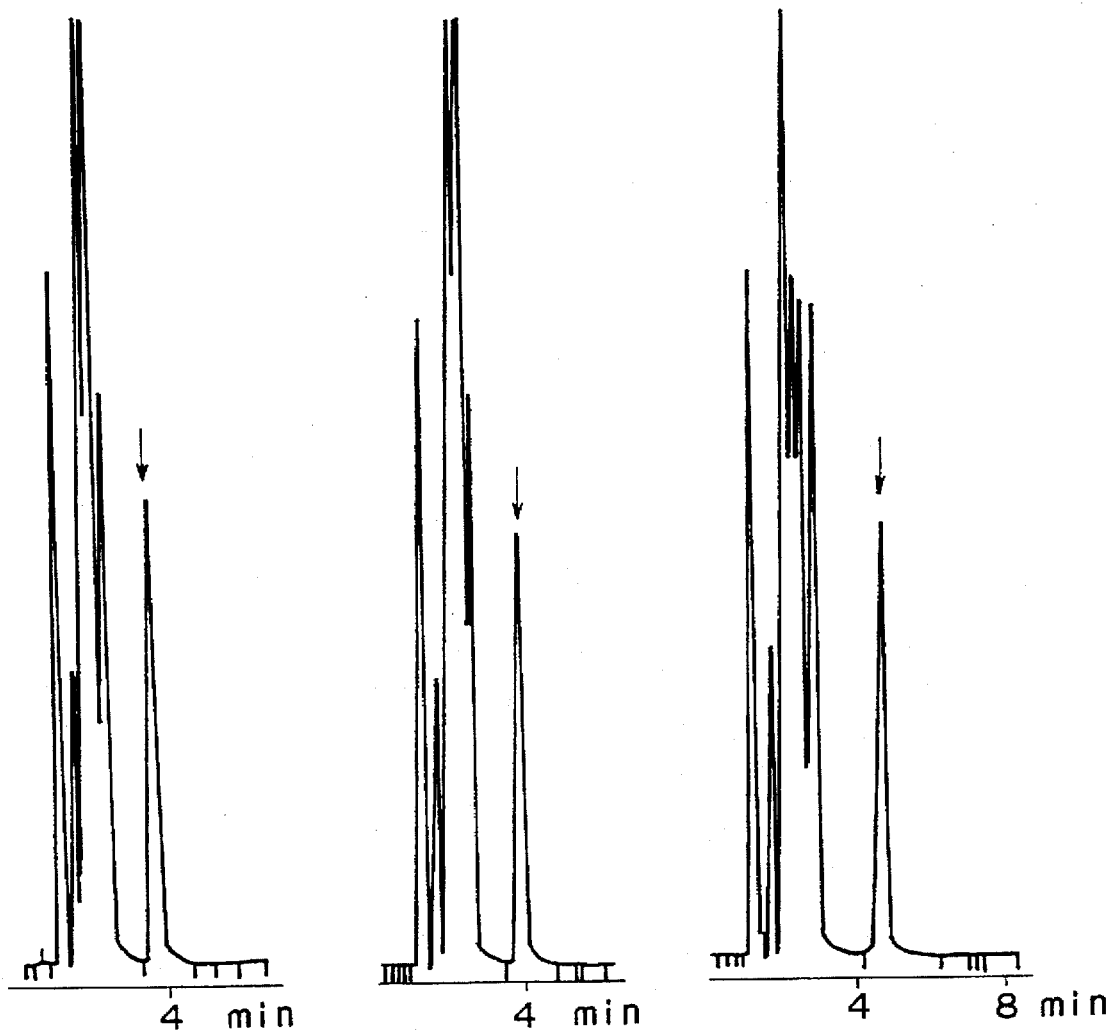

Also, by increasing the amount of styrene added, it becomes possible to control the retention time. As a general tendency, the increase of the amount added will result in an increased retention time FIG. 8 shows the change of the retention time of naphthalene (indicated by ↓) when styrene is made 3% . . . (A), 5% . . . (B), 10% . . . (C) in molar ratio.

The measurement conditions are column size: inner diameter 4.6 mm×length 100 mm, temperature: 40° C., mobile phase: methanol/water=50/50, flow rate: 1.0 mm/ml, detector: UV (254 nm).

As apparent from the above figure, the retention time until the elution peak appears becomes longer as the styrene content becomes larger.

Elution of basic substance

The packing material according to this Example is of the completely polymer-coated type and has no remaining metal attributable to Lewis acid, because no Lewis acid is used in the hydrophobic modification treatment or the hydrophilic modification treatment.

Figure 9:
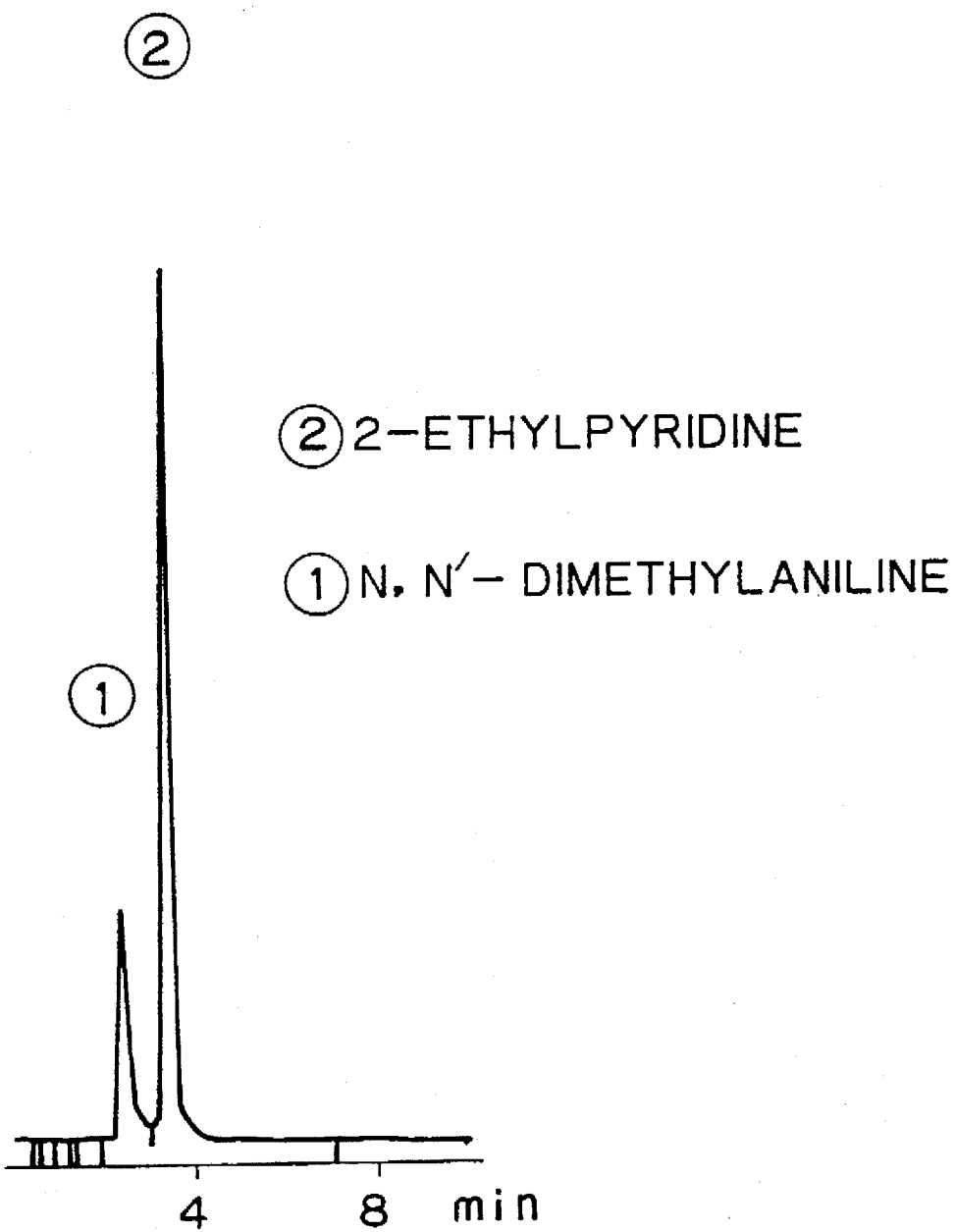

Accordingly, as also shown in FIG. 9, it is possible to elute also such substance as 2-ethylpyridine or N,N'-dimethylaniline.

Example 2

Packing Material (1) Prepared by the Hydrophilic Modification Treatment—the Hydrophobic Modification Treatment Preparation Process An amount 10 g of spherical silica gel powder having pores each with a diameter of about 60 Å and an average particle size of 5 µm and 2 g of a cyclic silicone compound (in the above compound (1), one wherein $R_1=CH_3$, a=3–5, b=0, c=0) were taken into separate sealed vessels both of which were connected together, and subjected to interfacial polymerization by nitrogen bubbling the cyclic silicone compound, thereby bringing the compound into contact with the silica gel powder surface under gas phase state.

Then, the silica gel powder was taken out of the vessel, and heated in a thermostatic tank at 105° C. for 1 hour.

After cooling, 5 g of the powder was taken into a 3-necked flask of 200 ml, and to the powder were added 0.5 mg of chloroplatinic acid as the catalyst, 5 g of tetraol (hydrophilic group R') and 40 ml of water and the mixture was heated under reflux in an oil bath for 0.5 hour, and then filtered through a glass filter (G-4), and further, thoroughly washed with water and acetone, followed by drying in a thermostatic tank of 105° C. for 2 hours.

Subsequently, the dry powder obtained was taken into a 3-necked flask of 100 ml, and to the powder were added as the catalyst 0.5 mg of tri-n-octylmethylammonium salt of chloroplatinic acid and 40 ml of 1-octene (hydrophobic group R $C_8$), followed by heating under reflux in an oil bath for 5 hours. The mixture was filtered through a glass filter, subsequently thoroughly washed with chloroform and acetone and filtered, followed by drying in a thermostatic tank of 105° C. for 2 hours to give a packing material for liquid chromatography according to Example 2.

Elution Example 2-1

The packing material prepared in the above Example 2 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenytoin (40 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was effected at 254 nm. The injected amount was 10 µl.

Figure 10A:
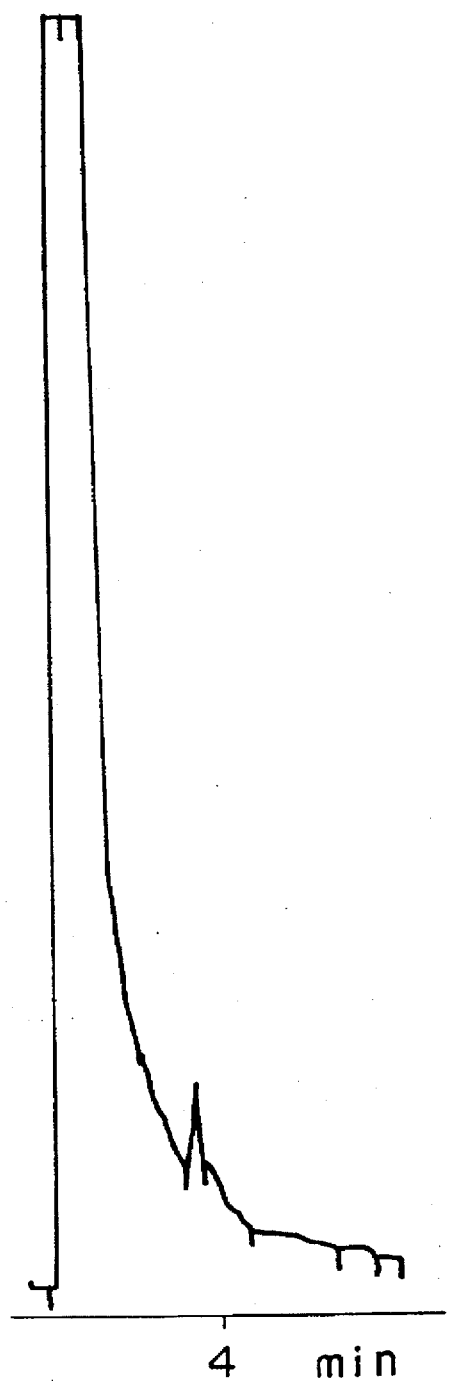

FIG. 10 shows the chromatogram obtained.

FIG. 10 (A) indicates Sample A, showing the peak of the rat plasma protein eluted immediately after injection.

Figure 10B:
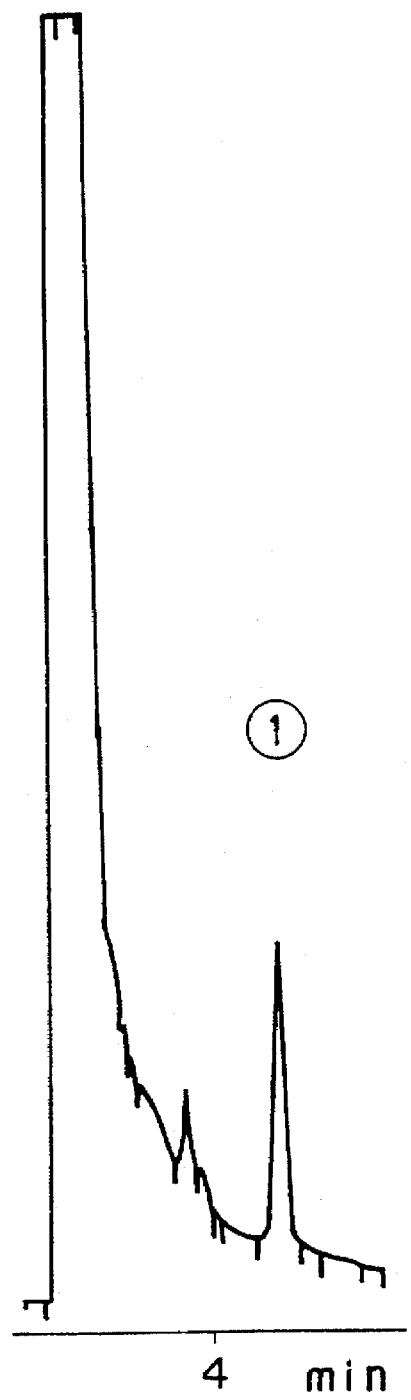

FIG. 10(B) indicates Sample B, showing that the peak of phenytoin (1) eluted after the rat plasma protein was thoroughly separated from the plasma component.

Elution Example 2—2

The packing material prepared in the above Example 2 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which carbamazepine (40 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 285 nm. The injected amount was 10 µl.

FIG. 11 shows the chromatogram obtained.

Figure 11A:
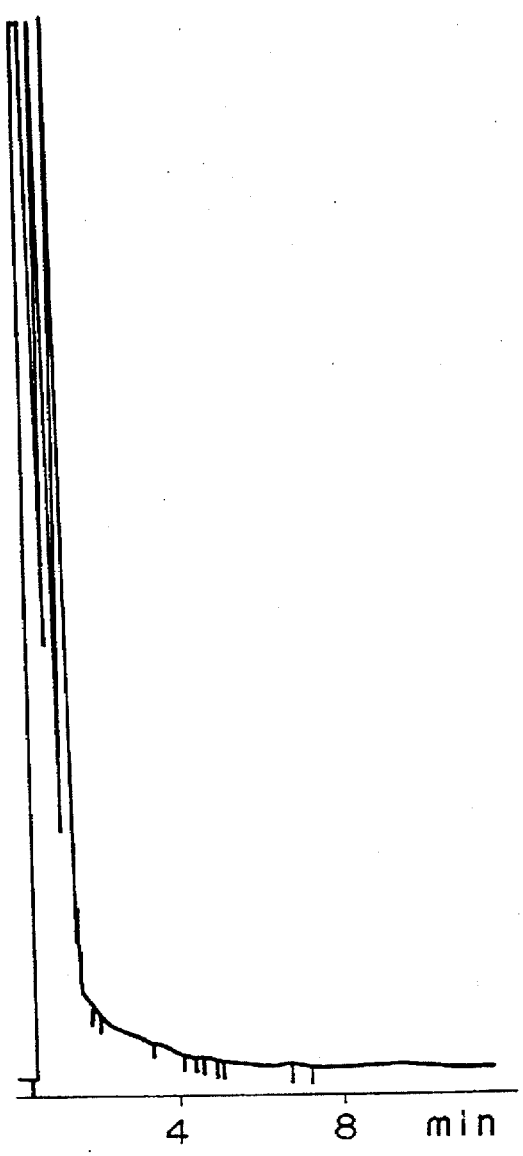

FIG. 11(A) indicates Sample A, showing the peak of the rat plasma protein eluted immediately after injection.

Figure 11B:
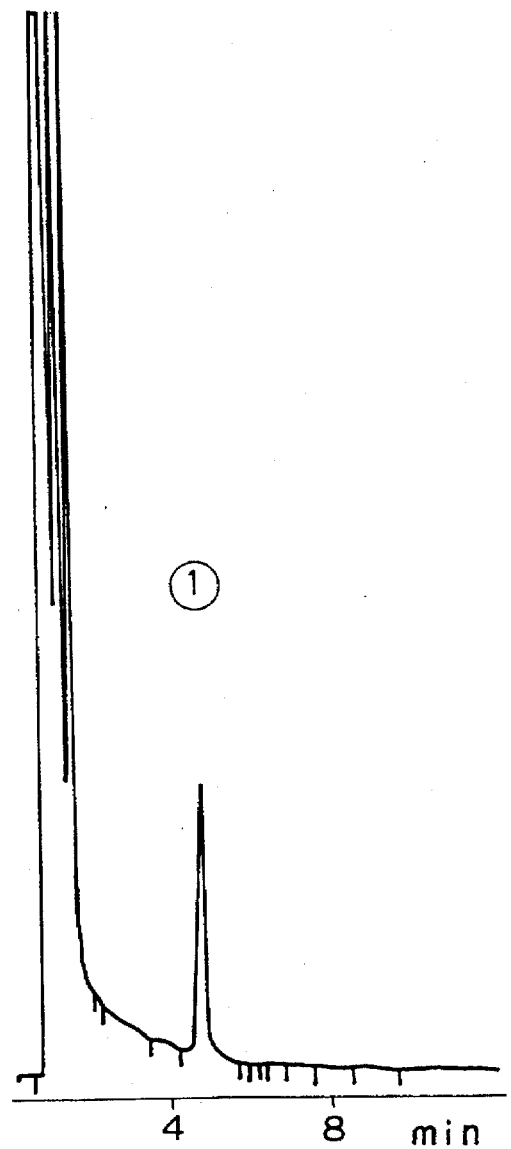

FIG. 11(B) indicates Sample B, showing that the peak of carbamazepine (1) eluted after the rat plasma protein was thoroughly separated from the plasma component.

Elution Example 2-3

The packing material prepared in the above Example 2 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenobarbital (20 µg/ml) was added as the standard (Sample B). The mobile phase was 100 mM $NaH_2PO_4$-100 mM $Na_2HPO_4$—$CH_3CN$ (45-45-10) delivered at 1.0 ml/min. and detection was carried out at 240 nm. The injected amount was 10 µl.

FIG. 12 shows the chromatogram obtained.

FIG. 12(A) indicates Sample A, showing the peak of the rat plasma protein eluted immediately after injection.

FIG. 12(B) indicates Sample B, showing that the peak of phenobarbital (1) eluted after the rat plasma protein was thoroughly separated from the plasma component.

Example 3

Packing Material (2) Prepared by the Hydrophilic Modification Treatment—the Hydrophobic Modification Treatment Preparation Process An amount 5 g of spherical silica gel powder having pores each with a diameter of about 60 Å and an average particle size of 5 µm and 2 g of a cyclic silicone compound (in the above compound (1), one wherein $R_1=CH_3$, a=3–5, b=0, c=0) were taken into separate sealed vessels connected together, and subjected to interfacial polymerization by nitrogen bubbling the cyclic silicone compound, thereby bringing the compound into contact with the silica gel powder surface under gas phase state.

Then, the silica gel powder was taken out of the vessel, and heated in a thermostatic tank at 105° C. for 1 hour.

After cooling, 5 g of the powder was taken into a 3-necked flask of 200 ml, and to the powder were added 0.5 mg of chloroplatinic acid as the catalyst, 5 g of tetraol and 40 ml of water and the mixture was heated under reflux in an oil bath for 0.5 hour, and then filtered through a glass filter (G-4), and further thoroughly washed with water and acetone, followed by drying in a thermostatic tank of 105° C. for 2 hours.

Subsequently, the dry powder obtained was taken into a 3-necked flask of 100 ml, and to the powder were added as the catalyst 0.5 mg of tri-n-butylammonium salt of chloroplatinic acid and 25 ml of styrene (hydrophobic group R phenyl), followed by heating under reflux in an oil bath for 5 hours. The mixture was filtered through a glass filter, subsequently thoroughly washed with toluene, chloroform and acetone and filtered, followed by drying in a thermostatic tank of 105° C. for 2 hours to give a packing material for liquid chromatography according to this Example.

Elution Example 3-1

The packing material prepared in the above Example 3 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenytoin (40 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 254 nm. The injected amount was 10 µl.

FIG. 13 shows the chromatogram obtained.

Figure 13A:
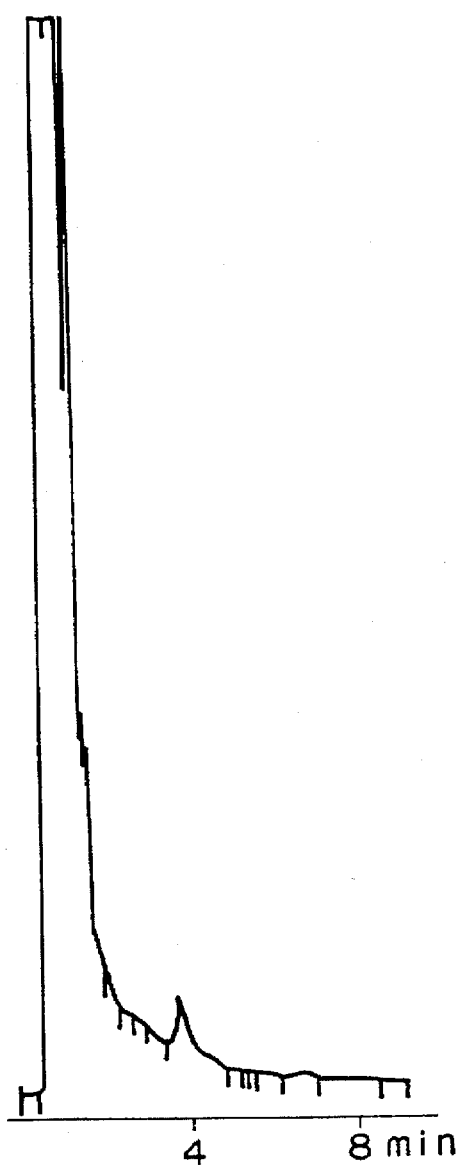

FIG. 13(A) indicates Sample A, showing the peak of the rat plasma protein eluted immediately after injection.

Figure 13B:
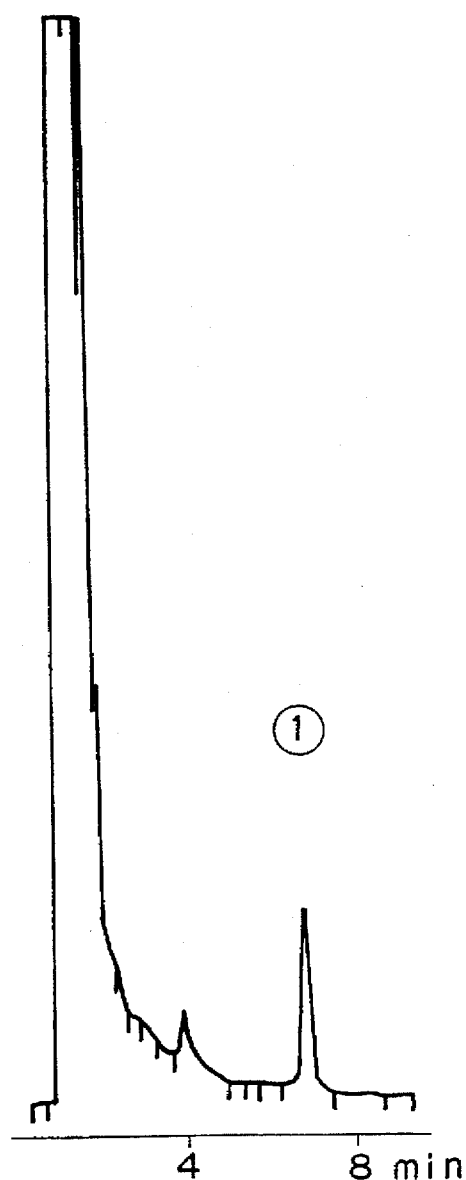

FIG. 13(B) indicates Sample B, showing that the peak of phenytoin (1) eluted after the rat plasma protein was thoroughly separated from the plasma component.

Elution Example 3-2

The packing material prepared in the above Example 3 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which carbamazepine (10 µg/ml) was added as the standard (Sample B). The mobile phase was 100 mM $NaH_2PO_4$- 100 mM $Na_2HPO_4$—$CH_3CN$ (42.5-42.5-15) delivered at 1.0 ml/min. and detection was carried out at 285 nm. The injected amount was 10 µl.

FIG. 14 shows the chromatogram obtained.

FIG. 14(A) indicates Sample A, showing the peak of the rat plasma protein eluted immediately after injection.

FIG. 14(B) indicates Sample B, showing that the peak of carbamazepine (1) eluted after the rat plasma protein was thoroughly separated from the plasma component.

Example 4

Packing Material (3) Prepared by the Hydrophilic Modification Treatment—the Hydrophobic Modification Treatment Preparation Process An amount 10 g of spherical silica gel powder having pores each with a diameter of about 60 Å and an average particle size of 5 µm and 2 g of a cyclic silicone compound (in the above compound (1), one wherein $R_1=CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under gas phase state.

Then, the silica gel powder was taken out of the vessel and heated in a thermostatic tank at 105° C. for 1 hour.

After cooling, 5 g of the powder was taken into a 3-necked flask of 200 ml, and to the powder were added 0.5 mg of chloroplatinic acid as the catalyst, 5 g of tetraol (hydrophilic group R') and 40 ml of water and the mixture was heated under reflux in an oil bath for 6 hours, and then filtered through a glass filter (G-4), and further thoroughly washed with water and ethanol, followed by drying in a thermostatic tank of 105° C. for 2 hours.

Subsequently, the dry powder obtained was taken into a 3-necked flask of 100 ml, and to the powder were added as the catalyst 0.5 mg of tri-n-octylmethylammonium salt of chloroplatinic acid and 30 ml of 1-octadecene (hydrophobic group R $C_{18}$), followed by heating under reflux in an oil bath for 5 hours. The mixture was filtered through a glass filter, subsequently thoroughly washed with chloroform, methanol and water and filtered, followed by drying in a thermostatic tank of 105° C. for 2 hours to give a packing material for liquid chromatography according to Example 4.

Elution Example 4-1

The packing material prepared in the above Example 4 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenobarbital (20 µg/ml) was added as the standard (Sample B). The mobile phase was 100 mM $NaH_2PO_4$-100 mM $Na_2HPO_4$—$CH_3CN$ (45-45-10) delivered at 1.0 ml/min. and detection was carried out at 240 nm. The injected amount was 10 µl.

FIG. 15 shows the chromatogram obtained.

Figure 15A:
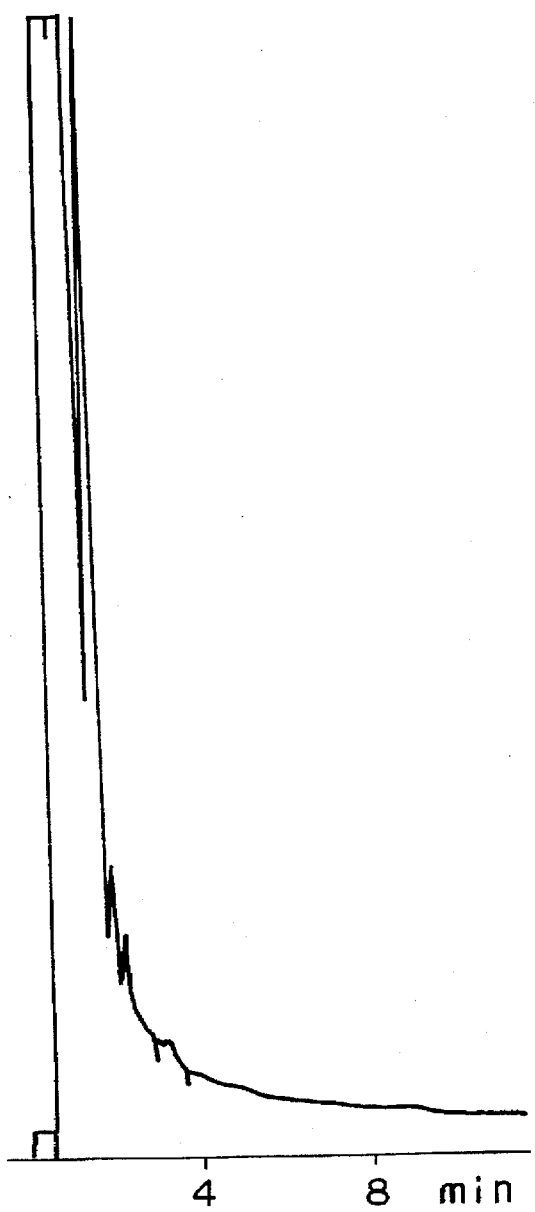

FIG. 15(A) indicates Sample A, showing the peak of the rat plasma protein eluted immediately after injection.

Figure 15B:
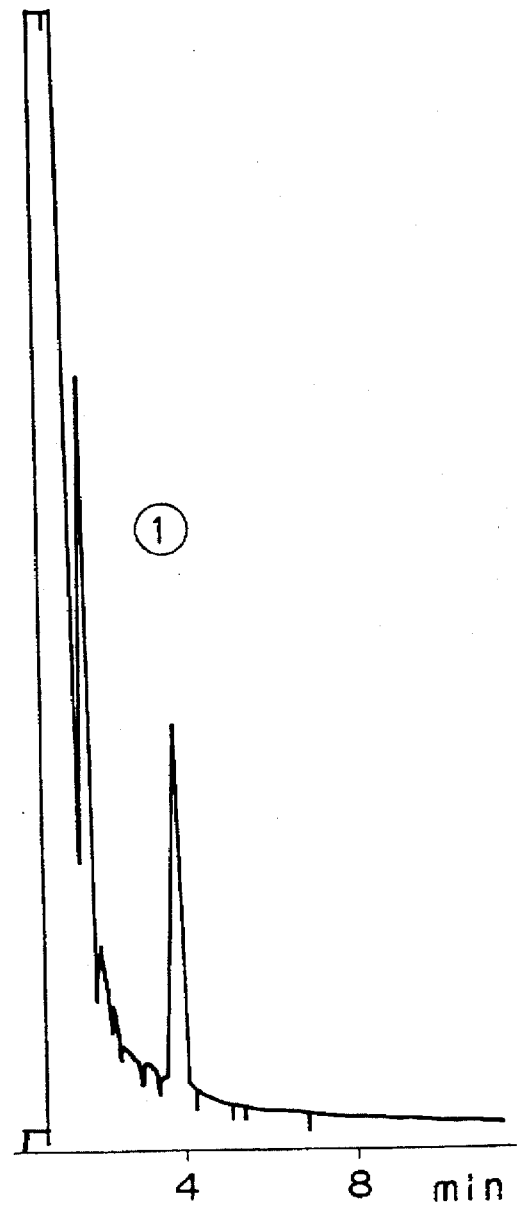

FIG. 15(B) indicates Sample B, showing that the peak of phenobarbital (1) eluted after the rat plasma protein was thoroughly separated from the plasma component.

Elution Example 4-2

The packing material prepared in the above Example 4 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which carbamazepine (10 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was effected at 285 nm. The injected amount was 10 µl.

FIG. 16 shows the chromatogram obtained.

FIG. 16(A) indicates Sample A, showing the peak of the rat plasma protein eluted immediately after injection.

FIG. 16(B) indicates Sample B, showing that the peak of carbamazepine (1) eluted after the rat plasma protein was thoroughly separated from the plasma component.

Example 5

Packing Material prepared by the Simultaneous Hydrophobic, Hydrophilic Modification Treatments Preparation Process An amount 10 g of spherical silica gel powder having pores each with a diameter of about 60 Å and an average particle size of 5 µm and 2 g of a cyclic silicone compound (in the above compound (1), one wherein $R_1$=$CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under gas phase state.

Then, the silica gel powder was taken out of the vessel and heated in a thermostatic tank at 105° C. for 1 hour.

After cooling, 3 g of the powder was taken into a 3-necked flask of 200 ml, and to the powder were added 0.5 mg of chloroplatinic acid as the catalyst, 1.638 g of tetraol (hydrophilic group R') and 0.1219 g of styrene (hydrophobic group R phenyl), 1 mg of p-t-butylcatechol and 40 ml of dimethylformamide and the mixture was heated under reflux in an oil bath at 120° C. for 5 hours, and then filtered through a glass filter (G-4), and further thoroughly washed with water and acetone, followed by drying in a thermostatic tank of 105° C. for 2 hours.

The above reaction was carried out in the amounts where the molar ratio of tetraol to styrene was 10:2 when the total moles of Si—H groups of the silicone polymer in the silica gel coated with the silicone polymer was made 10.

Here, the amount added is determined as calculated from the moles of Si—H groups, but the amount added can be varied as desired.

Also, no problem will arise if the amount of the hydrophobic groups added are made less than the total moles of Si—H groups, and the amount of tetraol added in an excess. Namely, tetraol can be added in an excessive amount compared to styrene (1-octadecene, 1-octene, etc.).

This is because the reactivity between styrene and —SiH group is much greater than that between —SiH group and tetraol. The reaction solvent may be considered to be preferably an alcohol such as ethanol, methanol, isopropanol or the water alcohol type.

Elution Example 5-1

The packing material prepared in the above Example 5 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenytoin (40 µg/ml) was added as the standard (Sample B). The mobile phase was 100 mM $NaH_2PO_4$-100 mM $Na_2HPO_4$-$CH_3CN$ (42.5-42.5-15) delivered at 1.0 ml/min. and detection was carried out at 254 nm. The injected amount was 10 µl.

Figure 17A:
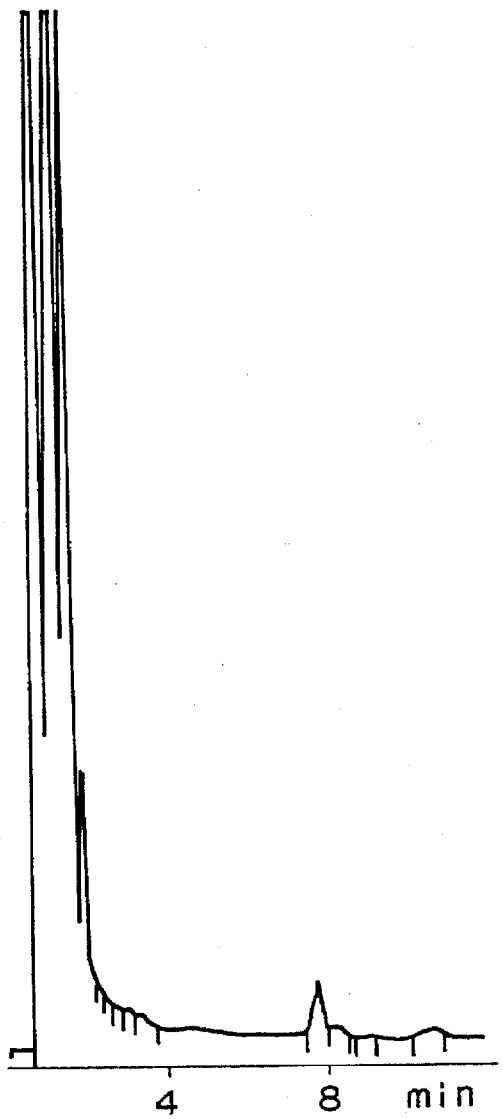
Figure 17B:
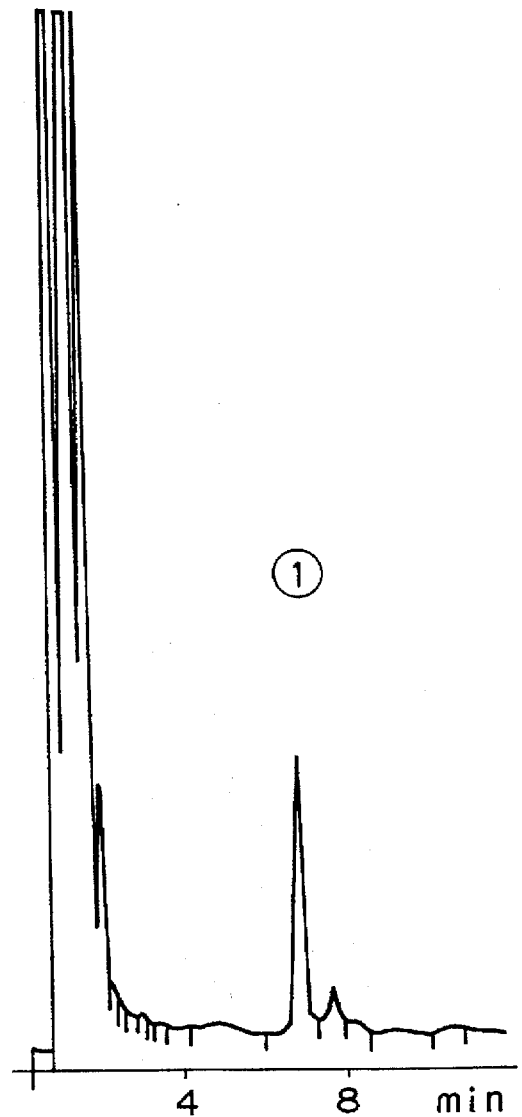

FIG. 17 shows the chromatogram obtained.

FIG. 17 (A) indicates Sample A, showing the peak of the rat plasma protein eluted immediately after injection.

FIG. 17 (B) indicates Sample B, showing that the peak of phenytoin ① eluted after the rat plasma protein was thoroughly separated from the plasma component.

Elution Example 5-2

The packing material prepared in the above Example 5 was packed into a column made of stainless steel-and 4.6 mm in inner diameter and 10 cm in length, according to the equilibrium slurry method, to prepare a packed column.

The column was used for an examination of a separation of a rat Control plasma (Sample A) and the rat Control plasma to which carbamazepine (10 µg/ml) was added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 285 nm. The injected amount was 10 µl.

FIG. 18 shows the chromatogram obtained.

FIG. 18(A) indicates Sample A, showing the peak of the rat plasma protein eluted immediately after injection.

FIG. 18(B) indicates Sample B, showing that the peak of carbamazepine (1) eluted after the rat plasma protein was thoroughly separated from the plasma component.

Example 6

Hydrophobic Modification—Epoxidation— Hydrophilic Modification Process

Preparation Process

An amount 10 g of spherical silica gel powder having pores each with a diameter of about 60 Å and an average particle size of 5 µm and 2 g of a cyclic silicone compound (in the above compound (1), one wherein $R_1=CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under a gas phase state.

Then, the silica gel powder was taken out of the vessel and heated in a thermostatic tank at 105° C. for 1 hour.

After cooling, 8 g of the powder was taken into a 3-necked flask of 200 ml, and to the powder were added 0.5 mg of tri-n-butylamine salt of chloroplatinic acid as the catalyst, 0.1579 g of styrene (hydrophobic group R phenyl), 40 ml of toluene and 10 mg of p-t-butylcatechol and the mixture was heated under reflux in an oil bath at 120° C. for 5 hours, and then filtered through a glass filter (G-4), and further, thoroughly washed with toluene and acetone, followed by drying in a thermostatic tank of 120° C. for 2 hours.

Subsequently, the dry powder and 0.5 mg of chloroplatinic acid as the catalyst were taken into a 3-necked flask of 200 ml, and 30 ml of isopropyl alcohol and 15 g of allyl glycidyl ether (intermediate group) were added thereto, followed by heating under reflux in an oil bath for 5 hours. The product was filtered through a glass filter, thoroughly washed with isopropyl alcohol and acetone and filtered, followed by drying in a thermostatic tank at 105° C. for 1 hour.

Next, 1.5 g of the dry powder obtained was taken into a 3-necked flask of 200 ml, and to this were added 0.2 g of ammonium dihydrogen phosphoate as the catalyst, 40 ml of water and 4 g of diglycerine, followed by heating under reflux in an oil bath for 5 hours. The product was filtered through a glass filter, thoroughly washed with water and acetone and filtered, followed by drying in a thermostatic tank of 105° C. for 1 hour to give a packing material according to Example 6.

Elution Example 6-1

The packing material prepared in the above Example 6 was packed into a column made of stainless steel and 4.6 mm in inner diameter and 10 cm in length, according to the equilibrium slurry method, to prepare a packed column.

The column was used for an examination of a separation of a rat Control plasma (Sample A) and the rat Control plasma to which phenobarbital (20 µg/ml) was added as the standard (Sample B). The mobile phase was 100 mM $NaH_2PO_4$-100 mM $Na_2HPO_4$—$CH_3CN$ (45-45-10) delivered at 1.0 ml/min. and detection was carried out at 240 nm. The injected amount was 10 µl.

Figure 19A:
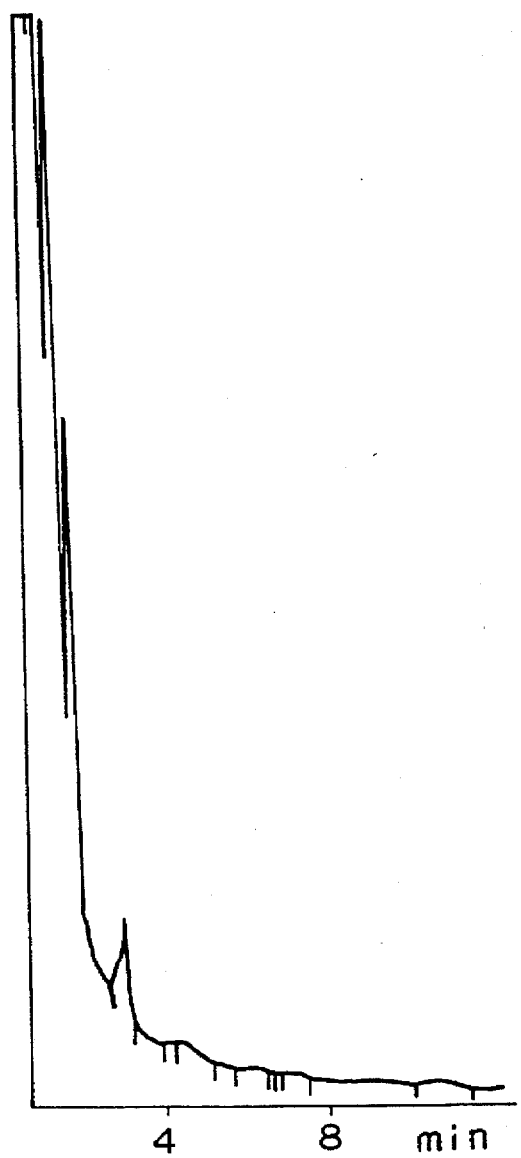
FIG. 19 is a diagram illustrating a separation state with the packing material according to Example 6 of the present invention.
Figure 19B:
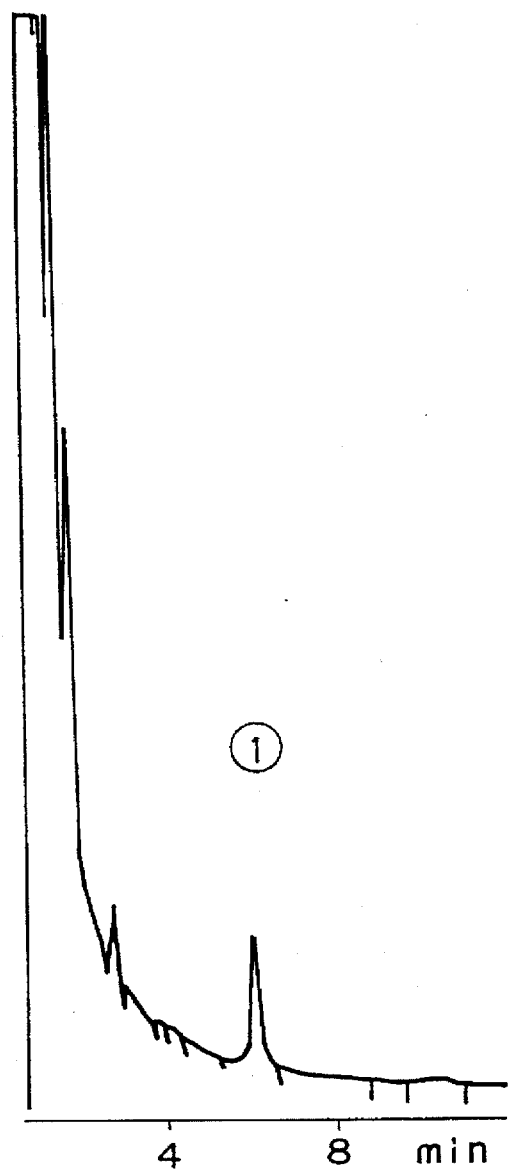

FIG. 19 shows the chromatogram obtained.

FIG. 19 (A) indicates Sample A, showing the peak of the rat plasma protein eluted immediately after injection.

FIG. 19 (B) indicates Sample B, showing that the peak of phenobarbital (1) eluted after the rat plasma protein was thoroughly separated from the plasma component.

Example 7

Packing Material Prepared by Hydrophobic Modification Treatment—Hydrophilic Modification Treatment Preparation Process An amount 10 g of spherical silica gel powder having pores each with a diameter of about 80 Å and an average particle size of 5 µm and 2 g of a cyclic silicone compound (in the above compound (1), one wherein $R_1=CH_3$, a=3–5, b=0, c=0) were taken into separate sealed vessels, which were connected together, and subjected to interfacial polymerization by nitrogen bubbling the cyclic silicone compound, whereby bringing the compound into contact with the silica gel powder surface under a gas phase state.

Then, the silica gel powder was taken out of the vessel and heated in a thermostatic tank at 105° C. for 1 hour.

After cooling, 10 g of the powder was taken into a 3-necked flask of 200 ml, and to the powder was added a reaction mixture of 40 ml of toluene, i mg of tri-n-butylammonium salt of chloroplatinic acid as the catalyst, 197.3 mg of styrene (hydrophobic group R) (corresponding to 5% (molar ratio) relative to the moles of the Si—H groups), and 10 mg of p-t-butylcatechol (polymerization inhibitor of styrene), and the mixture was heated under reflux in an oil bath at 120° C. for 5 hours, and then filtered through a glass filter (G-4), and further, thoroughly washed with toluene and acetone, followed by drying in a thermostatic tank of 105° C. for 1 hour.

Subsequently, 10 g of the resultant powder and 1 mg of chloroplatinic acid as the catalyst were taken into a 3-necked flask of 500 ml, and to this were added 100 ml of water and 10 g of tetraol (hydrophilic group R'), followed by heating under reflux in an oil bath for 4 hours. The mixture was filtered by a glass filter, washed thoroughly with water and acetone, and thereafter, dried in a thermostatic tank of 105° C. for 1 hour to give a packing material for liquid chromatography according to this Example.

Elution Example 7-1

An amount 1.5 g of the packing material according to Example 7 was packed into a column made of stainless steel and 4.6 mm in inner diameter and 10 cm in length, according to the equilibrium slurry method, by using a packer and a pump to prepare a packed column.

By using the column, a sample of a calf bovine Control serum with carbamazepine (10 µg/ml) as the standard was continuously injected, and k' and the peak shape of carbamazepine were examined at initiation of the test and after 500 continuous injections. The mobile phase was 100 mM $NaH_2PO_4$-100 mM $Na_2HPO_4$—$CH_3CN$ (44-44-12) delivered at 1.0 ml/min. and the detection carried out at 285 nm. The amount injected was 10 µl.

The chromatogram obtained is shown in FIG. 7.

Figure 20A:
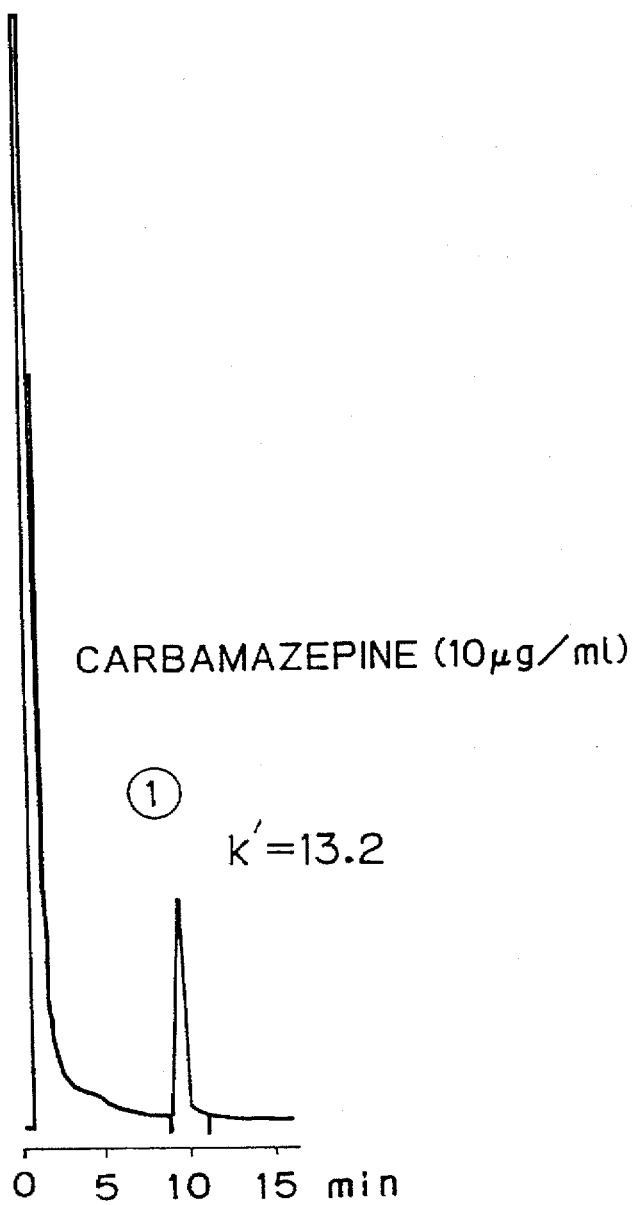
FIG. 20 is a diagram illustrating a separation state with the packing material according to Example 7 of the present invention.

FIG. 20(A) indicates the test initiation of the sample, showing that the peak of the calf bovine bovine serum protein eluted immediately after injection and k' of carbamazepine (1) was 13.2.

Figure 20B:
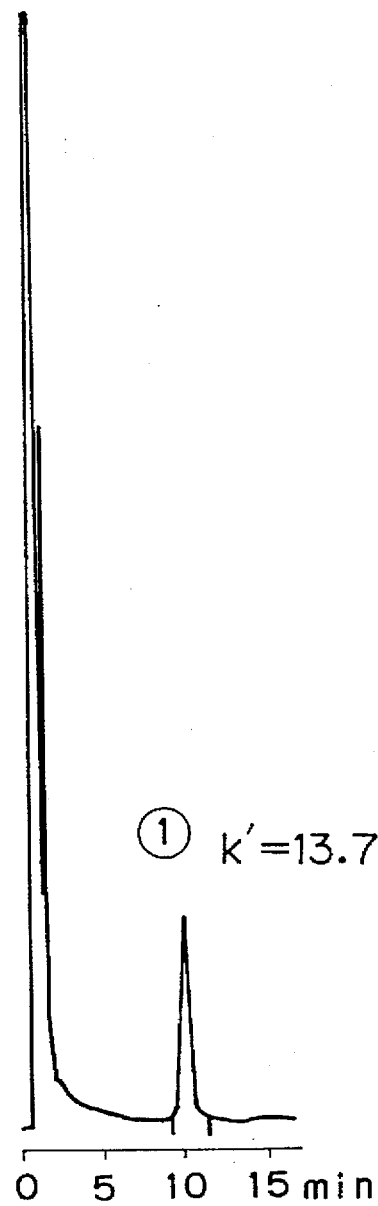

FIG. 20(B) indicates the 500th injection, showing that the peak of carbamazepine (1) eluted after the calf bovine serum protein, with k' being 13.7, was invariably the same as on initiation of the test, and the peak shape changed very little. Thus, the present packing material was very stable.

Example 8

Packing Material Prepared by Hydrophobic Modification Treatment—Hydrophilic Modification Treatment Preparation Process An amount 10 g of spherical silica gel powder having pores each with a diameter of about 80 Å and an average particle size of 5 µm and 2 g of a cyclic silicone compound (in the above compound (1), one wherein $R_1=CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under gas phase state.

Then, the silica gel powder was taken out of the vessel, and heated in a thermostatic tank at 105° C. for 1 hour.

After cooling, 4 g of the powder was taken into a 3-necked flask of 200 ml, and to the powder was added a reaction mixture of 40 ml of toluene, 2 mg of trioctylmethylammonium salt of chloroplatinic acid as the catalyst, 170.1 mg of 1-octene (hydrophobic group R) (corresponding to 10% (molar ratio) relative to the moles of the Si—H groups), and the mixture was heated under reflux in an oil bath at 120° C. for 5 hours, and then filtered through a glass filter (G-4), and further thoroughly washed with toluene and acetone, followed by drying in a thermostatic tank of 105° C. for 1 hour.

Subsequently, 1.8 g of the resultant powder and 1 mg of chloroplatinic acid as the catalyst were taken into a 3-necked flask of 200 ml, and to this were added 40 ml of water and 4 g of polyoxyethylene allyl ether (adduct of 16 moles ethylene oxide) (hydrophilic group R'), followed by heating under reflux in an oil bath for 2 hours. The mixture was filtered by a glass filter, washed thoroughly with water and acetone, and thereafter, dried in a thermostatic tank of 105° C. for 1 hour to give a packing material for liquid chromatography according to this Example.

Elution Example 8-1

The packing material according to Example 8 was packed into a column made of stainless steel and 4.6 mm in inner diameter and 10 cm in length, by use of a packer and a pump according to the equilibrium slurry method, to prepare a packed column.

The column was used for an examination of a separation of a calf bovine Control serum (Sample A) and the calf bovine Control serum to which theophylline (10 µg/ml) and caffeine (10 µg/ml) were added as the standard (Sample B). The mobile phase was 100 mM $NaH_2PO_4$-100 mM $Na_2HPO_4$—$CH_3CN$ (47.5-47.5-5) delivered at 1.0 ml/min. and detection was carried out at 270 nm. The injected amount was 10 µl.

The chromatogram obtained is shown in the following FIG. 21.

Figure 21A:
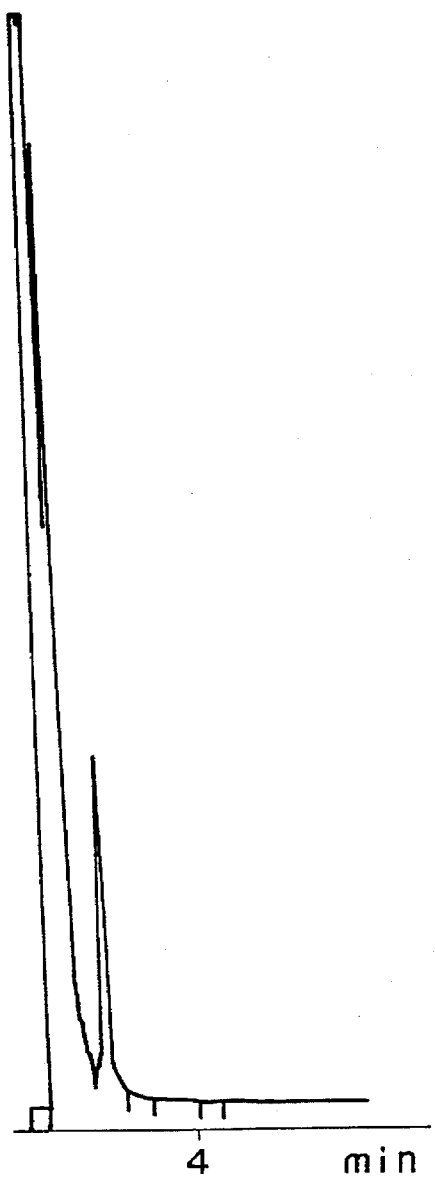
FIGS. 21 and 22 are diagrams illustrating separation states with the packing material according to Example 8 of the present invention.

FIG. 21(A) indicates Sample A, showing the peak of the calf bovine serum protein eluted immediately after injection.

Figure 21B:
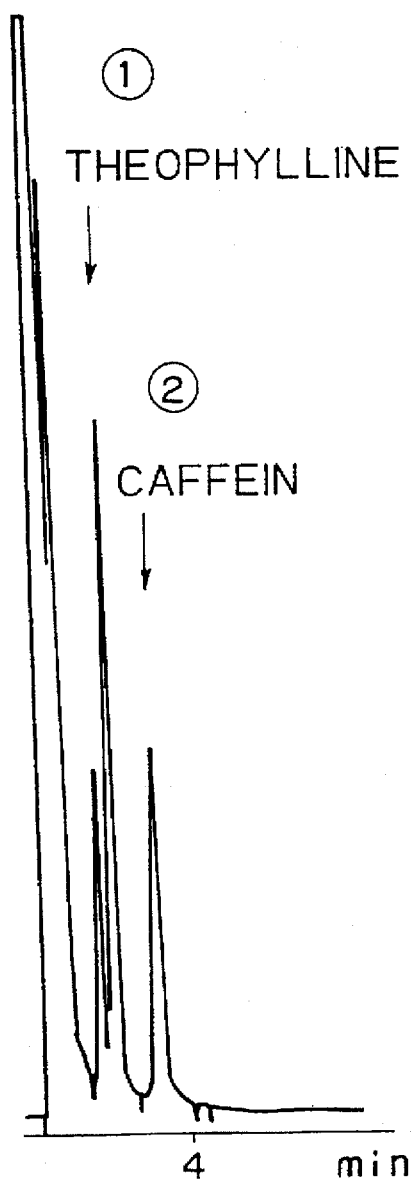

FIG. 21(B) indicates Sample B, showing that the peaks of theophylline (1) and caffeine (2) eluted after the calf serum protein was thoroughly separated from the serum component.

Elution Example 8-2

An amount 1.5 g of the packing material according to Example 8 was packed into a column made of stainless steel and 4.6 mm in inner diameter and 10 cm in length, according to the equilibrium slurry method using a packer and a pump, to prepare a packed column.

By using the column, a sample of a calf bovine Control serum with phenobarbital (20 µg/ml) as the standard was continuously injected, and k' and the peak shape of phenobarbital were examined at initiation of the test and after 500 continuous injections. The mobile phase was 100 mM $NaH_2PO_4$-100 mM $Na_2HPO_4$—$CH_3CN$ (42.5-42.5-15) delivered at 1.0 ml/min., and the detection carried out at 254 nm. The amount injected was 20 µl.

The chromatogram obtained is shown in FIG. 22.

Figure 22A:
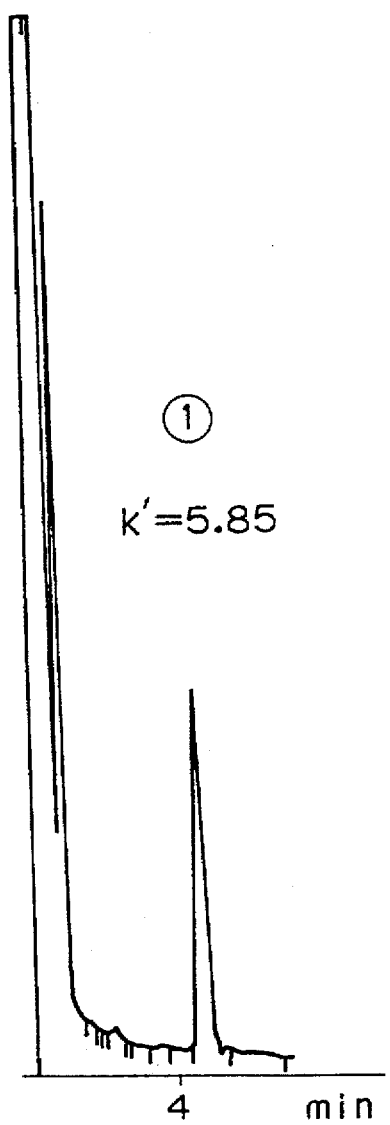

FIG. 22(A) indicates the test initiation of the sample, showing that the peak of the calf serum protein eluted immediately after injection and k' of phenobarbital (1) was 5.85.

Figure 22B:
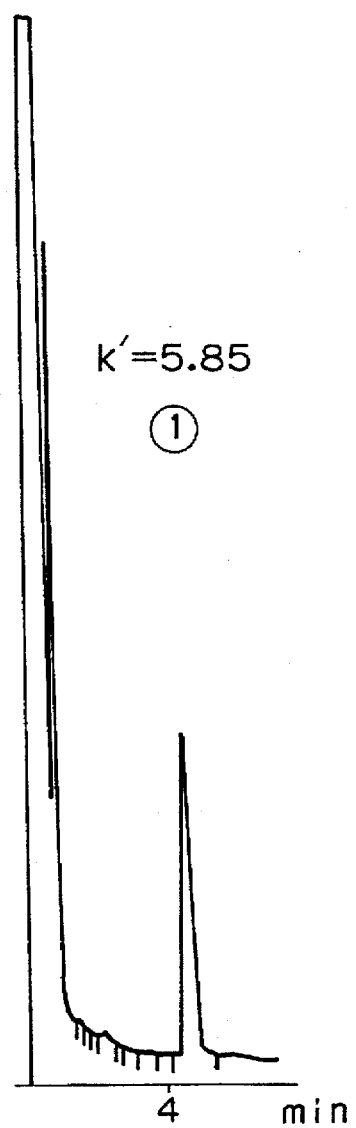

FIG. 22(B) indicates the 500th injection, showing that the peak of phenobarbital (1) eluted after the calf serum protein, with k' being 5.85 as invariably as on initiation of the test, and that the peak shape changed very little. Thus, the present packing material was very stable.

Example 9

Packing Material Prepared by Hydrophobic Modification Treatment—Hydrophilic Modification Treatment Preparation Process An amount 10 g of spherical silica gel powder having pores each with a diameter of about 80 Å and an average particle size of 5 µm and 2 g of a cyclic silicone compound (in the above compound (1), one wherein $R_1$=$CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under a gas phase state.

Then, the silica gel powder was taken out of the vessel, and heated in a thermostatic tank at 105° C. for 1 hour.

After cooling, 4 g of the powder was taken into a 3-necked flask of 100 ml, and to the powder was added a reaction mixture of 20 ml of toluene, 2 mg of tri-n-butylammonium salt of chloroplatinic acid as the catalyst, 157.9 mg of styrene (hydrophobic group R) (corresponding to 10% (molar ratio) relative to the moles of the Si—H groups) and 1 mg of p-t-butylcatechol (polymerization inhibitor of styrene), and the mixture was heated under reflux in an oil bath at 120° C. for 5 hours, and then filtered through a glass filter (G-4), and further, thoroughly washed with toluene and acetone, followed by drying in a thermostatic tank of 105° C. for 1 hour.

Subsequently, 2 g of the resultant powder and 1 mg of chloroplatinic acid as the catalyst were taken into a 3-necked flask of 200 ml, and to this were added 40 ml of water and 6 g of polyoxyethylene allyl ether (hydrophilic group R'), followed by heating under reflux in an oil bath for 5 hours. The mixture was filtered by a glass filter, washed thoroughly with water and acetone, and thereafter, dried in a thermostatic tank of 105° C. for 1 hour to give a packing material for liquid chromatography according to this Example.

Elution Example 9-1

The packing material according to Example B was packed into a column made of stainless steel and 4.6 mm in inner diameter and 10 cm in length, by using a packer and a pump according to the equilibrium slurry method, to prepare a packed column.

The column was used for an examination of a separation of a calf bovine Control serum (Sample A) and the calf bovine Control serum to which phenobarbital (20 µg/ml), carbamazepine (10 µg/ml) and phenytoin (40 µg/ml) were added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 254 nm. The injected amount was 10 µl.

The chromatogram obtained is shown in the FIG. 23.

Figure 23A:
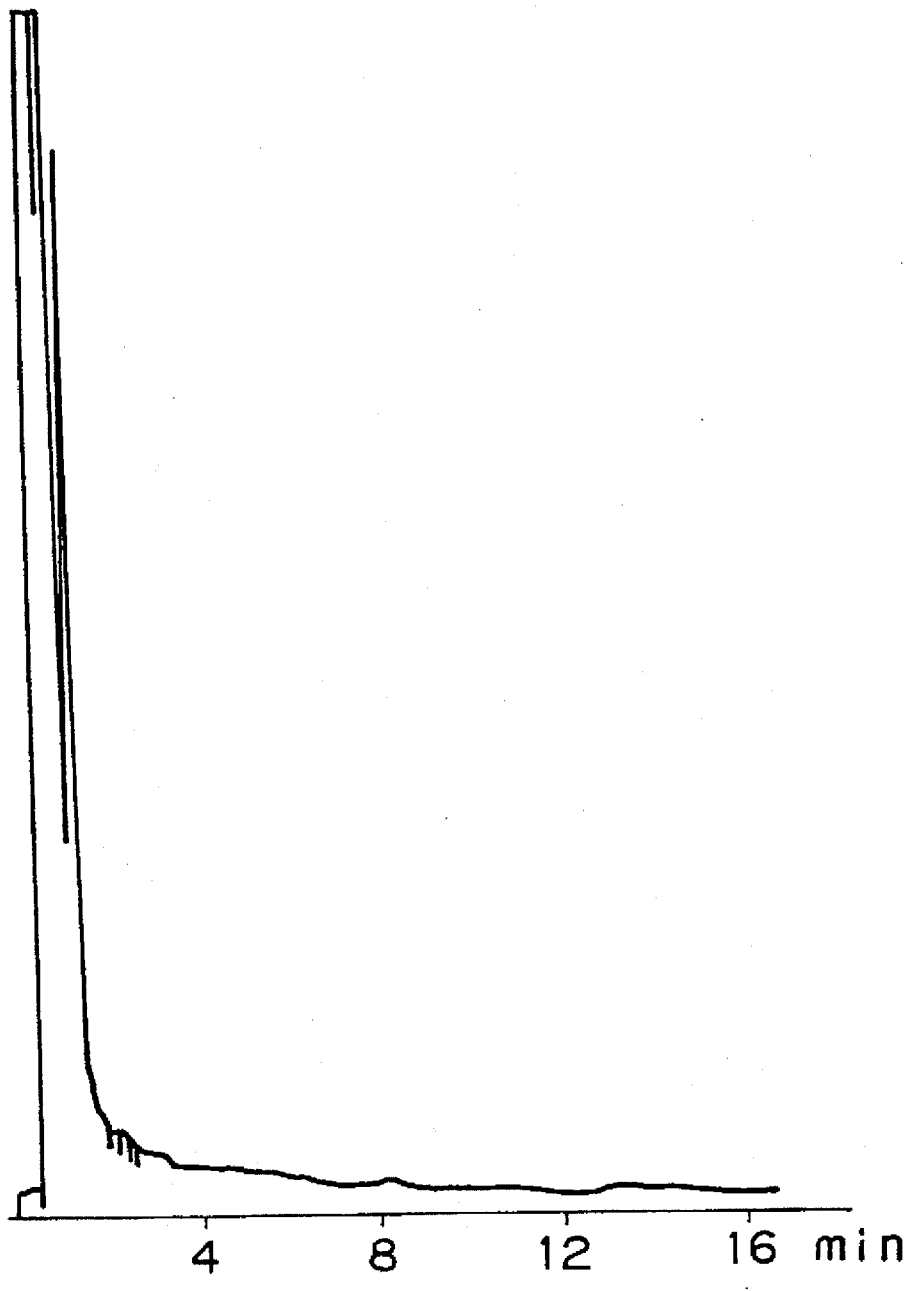
FIG. 23 is a diagram illustrating a separation state with the packing material according to Example 9 of the present invention.

FIG. 23(A) indicates Sample A, showing the peak of the calf serum protein eluted immediately after injection.

Figure 23B:
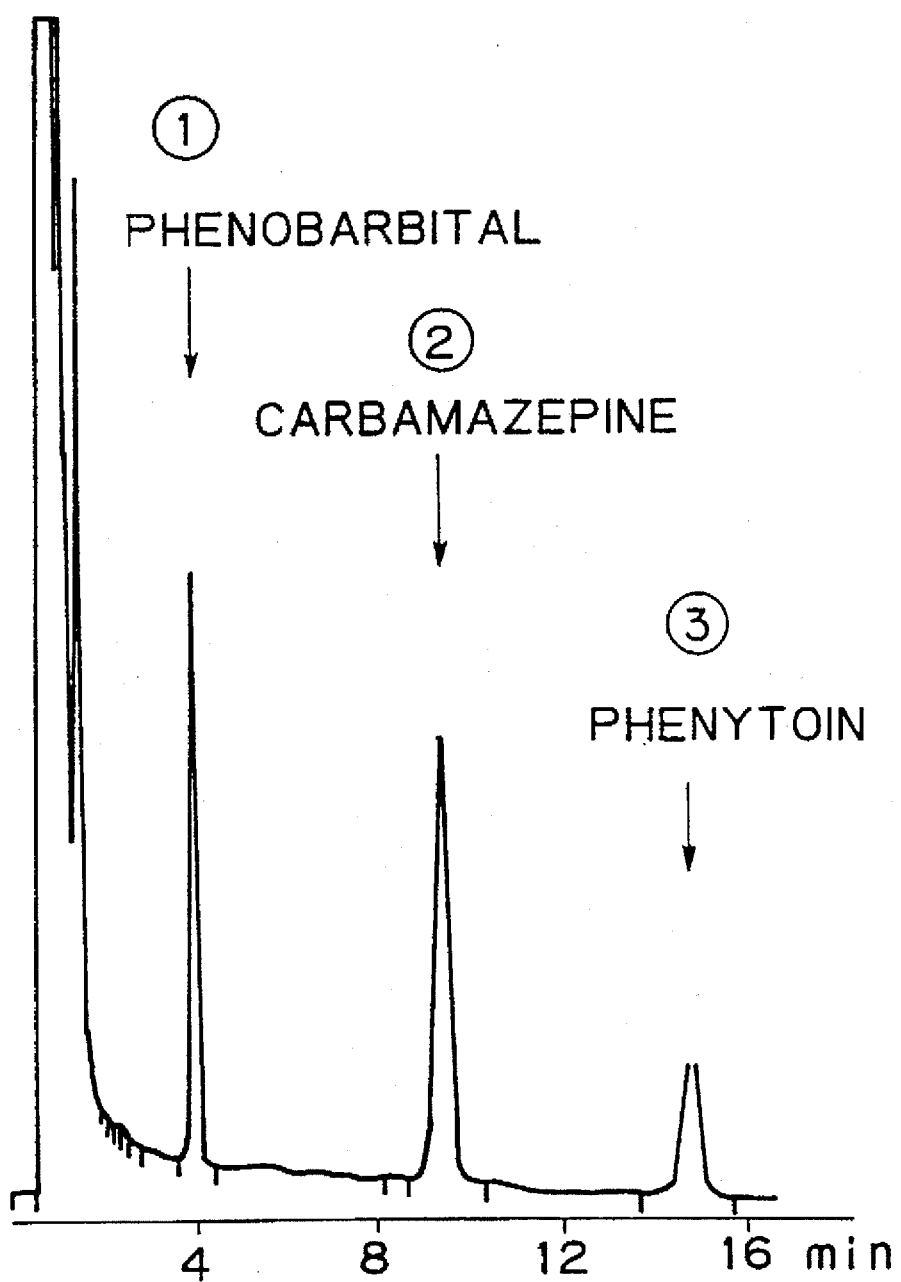

FIG. 23(B) indicates Sample B, showing that the peaks of phenobarbital (1), carbamazepine (2) and phenytoin (3) eluted after the calf bovine serum protein was thoroughly separated from the serum component.

Example 10

Packing Material Prepared by Hydrophobic Modification Treatment—Hydrophilic Modification Treatment Preparation Process An amount 10 g of spherical silica gel powder having a fine pore of about 80 Å and an average particle size of 5 μm and 2 g of a cyclic silicone compound (in the above compound (1), one wherein $R_1=CH_3$, a=3–5, b=0, c=0) were taken into separate sealed vessels, which were connected together, and subjected to interfacial polymerization by nitrogen bubbling the cyclic silicone compound, thereby bringing the compound into contact with the silica gel powder surface under a gas phase state.

Then, the silica gel powder was taken out of the vessel, and heated in a thermostatic tank at 105° C. for 1 hour.

After cooling, 4 g of the powder was taken into a 3-necked flask of 100 ml, and to the powder was added a reaction mixture of 20 ml of toluene, 2 mg of tri-n-butylammonium salt of chloroplatinic acid as the catalyst, 315.8 mg of styrene (hydrophobic group R) (corresponding to 20% (molar ratio) relative to the moles of the Si—H groups) and 1 mg of p-t-butylcatechol (polymerization inhibitor of styrene), and the mixture was heated under reflux in an oil bath at 120° C. for 5 hours, and then filtered through a glass filter (G-4), and further thoroughly washed with toluene and acetone, followed by drying in a thermostatic tank of 105° C. for 1 hour.

Subsequently, 2 g of the resultant powder and 1 mg of chloroplatinic acid as the catalyst were taken into a 3-necked flask of 200 ml, and to this were added 40 ml of water and 6 g of polyoxyethylene allyl ether (hydrophilic group R'), followed by heating under reflux in an oil bath for 5 hours. The mixture was filtered by a glass filter, washed thoroughly with water and acetone, and thereafter, dried in a thermostatic tank of 105° C. for 1 hour to give a packing material for liquid chromatography according to this Example.

Elution Example 10-1

An amount 1.5 g of the packing material according to Example 10 was packed into a column made of stainless steel and 4.6 mm in inner diameter and 10 cm in length, by using a packer and a pump according to the equilibrium slurry method, to prepare a packed column.

The column was used for an examination of a separation of a calf bovine Control serum (Sample A) and the calf bovine Control serum to which cortizole (10 μg/ml) and corticosterone (10 μg/ml) were added as the standard (Sample B). The mobile phase was 100 mM $NaH_2PO_4$-100 mM $Na_2HPO_4$—$CH_3CN$ (42.5-42.5-15) delivered at 1.0 ml/min. and detection was carried out at 254 nm. The injected amount was 10 μl.

The chromatogram obtained is shown in the FIG. 24.

Figure 24A:
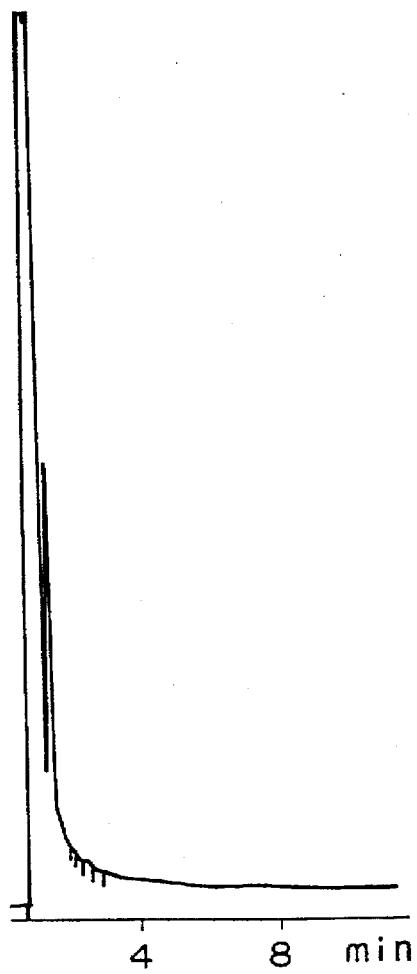
FIGS. 24 and 25 are diagrams illustrating separation states with the packing material according to Example 10 of the present invention.

FIG. 24(A) indicates the elution state of Sample A, showing the peak of the calf serum protein eluted immediately after injection.

Figure 24B:
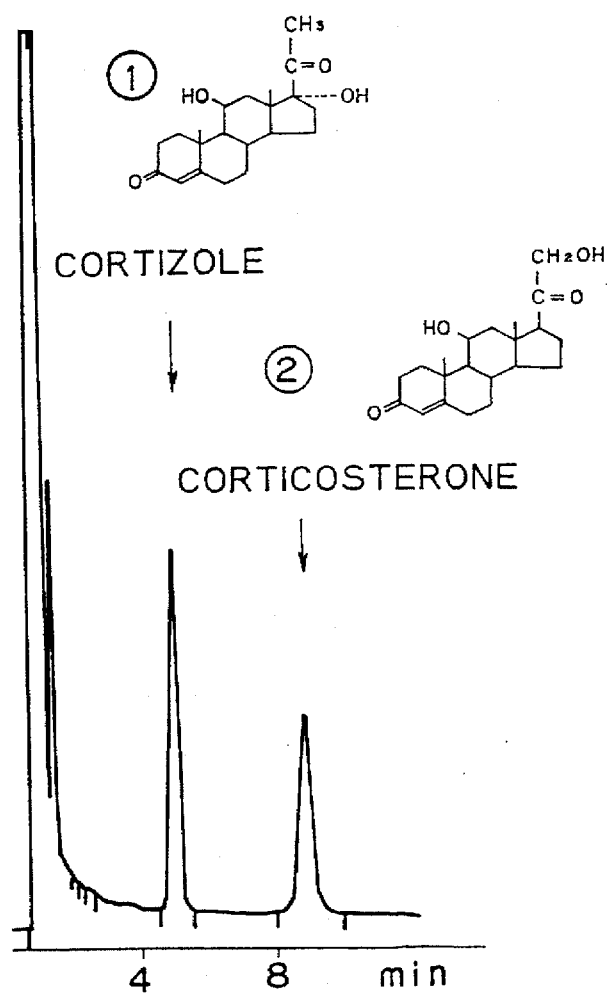

FIG. 24(B) indicates Sample B, showing that the peaks of cortizole (1) and corticosterone (2) eluted after the calf bovine serum protein was thoroughly separated from the serum component.

Elution Example 10-2

The packing material according to Example 10 was packed into a column made of stainless steel and 4.6 mm in inner diameter and 10 cm in length, according to the equilibrium slurry method using a packer and a pump, to prepare a packed column.

By using the column, a sample of a calf bovine Control serum with trimetoprim (25 μg/ml) as the standard was continuously injected, and k' and the peak shape of trimetoprim were examined at initiation of the test and after 350 continuous injections. The mobile phase was 100 mM $NaH_2PO_4$-100 mM $Na_2HPO_4$—$CH_3CN$ (45-45-10) delivered at 1.0 ml/min., and the detection carried out at 254 nm. The amount injected was 20 μl.

Figure 25A:
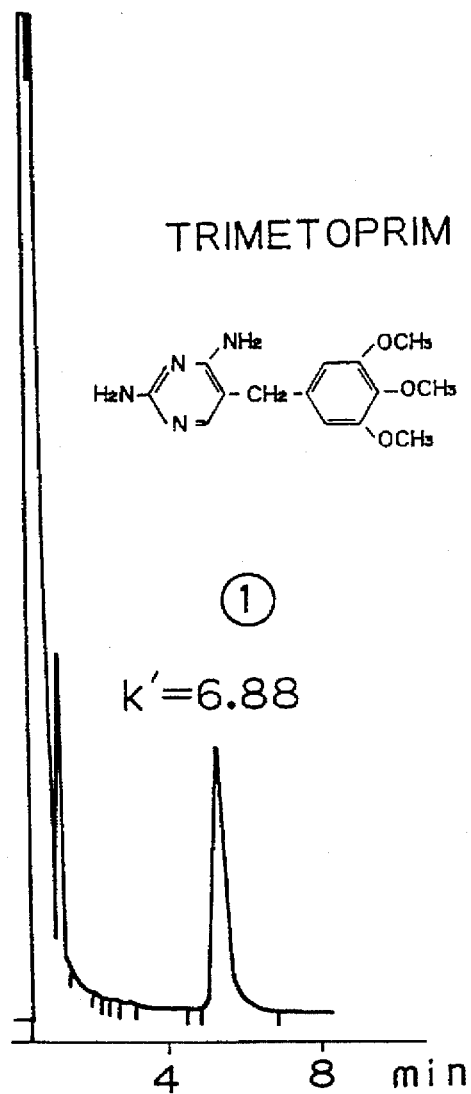
Figure 25B:
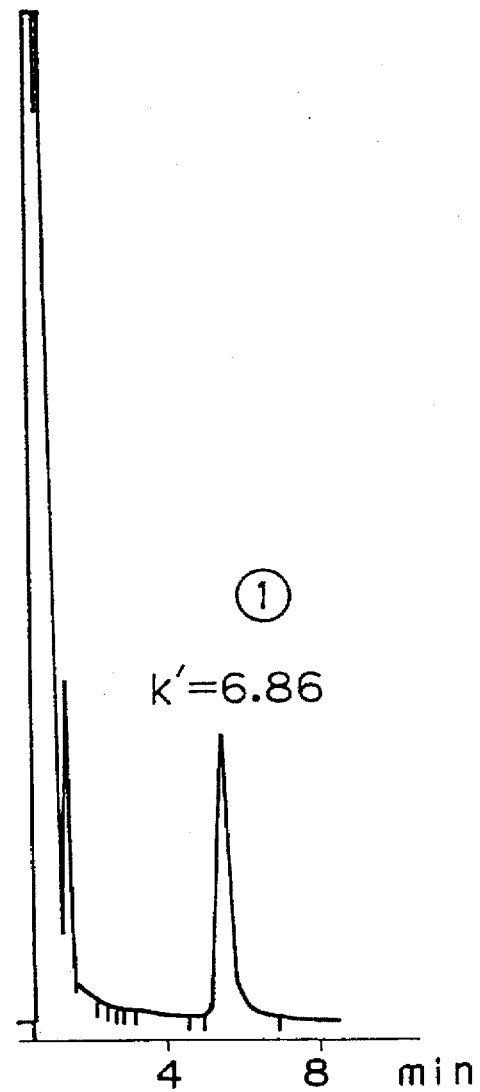

The chromatogram obtained is shown in FIG. 25.

FIG. 25 (A) indicates the test initiation of the sample, showing that the peak of the calf serum protein eluted immediately after injection and k' of trimetoprim was 6.88.

FIG. 25 (B) indicates the 350th injection, showing that the peak of trimetoprim (1) eluted after the calf bovine serum protein, with k' being 6.86 as invariably as on initiation of the test, and also the peak shape changed very little. Thus, the present packing material was very stable.

As described above, the packing material according to the present invention is a resin capsule type with the support uniformly coated with the silicone resin, and therefore, will not be substantially influenced by the polar groups possessed by individual powder (e.g. silanol group of silica gel).

Also, since a part of the external surface of the packing material is hydrophilic, no protein, etc., will be absorbed and a stable packing material having an excellent separation ability can be obtained.

What is claimed is:

1. A packing material for a column comprising a porous support coated with silicone polymer having an Si—R bond, wherein R is a hydrophobic group and an Si—R' bond, wherein R' is a hydrophilic group.

2. A packing material as claimed in claim 1, wherein the R' group is a hydrophilic group having a hydroxyl group.

3. A packing material as claimed in claim 1, wherein the R group is a hydrocarbon residue having 1 to 18 carbon atoms.

4. A packing material for a column consisting essentially of a porous support coated with silicone polymer having a Si—R bond, wherein R is a hydrophobic group and an Si—R' bond, wherein R' is a hydrophilic group.

5. A packing material as claimed in claim 1, wherein the coating is about 3 to 30 Å in thickness and the molecular weight of the silicone polymer is more than about 150,000.

* * * * *